US012800880B2

(12) United States Patent
Chen et al.

(10) Patent No.: US 12,800,880 B2
(45) Date of Patent: Nov. 17, 2026

(54) OPTICAL IMAGING LENS AND ELECTRONIC DEVICE COMPRISING THE SAME

(71) Applicant: Genius Electronic Optical (Xiamen) Co., Ltd., Xiamen (CN)

(72) Inventors: Shih-Han Chen, Taichung City (TW); Huabin Liao, Taichung City (TW); Changlin Zhao, Taichung City (TW)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 254 days.

(21) Appl. No.: 18/814,845

(22) Filed: Aug. 26, 2024

(65) Prior Publication Data

US 2025/0060565 A1 Feb. 20, 2025

Related U.S. Application Data

(63) Continuation of application No. 18/219,834, filed on Jul. 10, 2023, now Pat. No. 12,099,170, which is a continuation of application No. 17/858,476, filed on Jul. 6, 2022, now Pat. No. 11,740,441, which is a continuation of application No. 16/915,376, filed on Jun. 29, 2020, now Pat. No. 11,415,782, which is a continuation of application No. 16/866,282, filed on
(Continued)

(30) Foreign Application Priority Data

Jul. 29, 2014 (CN) ......................... 201410366295.4

(51) Int. Cl.

| | |
|---|---|
| ***G02B 13/00*** | (2006.01) |
| ***G02B 5/20*** | (2006.01) |
| ***G02B 9/62*** | (2006.01) |
| ***G02B 13/06*** | (2006.01) |
| ***H04N 23/50*** | (2023.01) |
| *H04N 23/51* | (2023.01) |
| *H04N 23/54* | (2023.01) |

(52) U.S. Cl.
CPC ......... *G02B 13/0045* (2013.01); *G02B 5/208* (2013.01); *G02B 9/62* (2013.01); *G02B 13/06* (2013.01); *H04N 23/50* (2023.01); *H04N 23/51* (2023.01); *H04N 23/54* (2023.01)

(58) Field of Classification Search
CPC ...... G02B 13/0045; G02B 5/208; G02B 9/62; G02B 13/06; G02B 1/041; H04N 23/50; H04N 23/51; H04N 23/54
See application file for complete search history.

(56) References Cited

U.S. PATENT DOCUMENTS

2015/0116573 A1* 4/2015 Liao ...................... H04N 23/55 359/713

* cited by examiner

*Primary Examiner* — James C. Jones
(74) *Attorney, Agent, or Firm* — Kilpatrick Townsend & Stockton LLP

(57) ABSTRACT

An optical imaging lens includes six lens elements. The object-side surface of the first lens element has a convex part in a vicinity of the periphery of the first lens element, the image-side surface of the second lens element has a concave part in a vicinity of the periphery of the first lens element, the object-side surface of the third lens element has a convex part in a vicinity of the optical axis, the image-side surface of the fourth lens element has a convex part in a vicinity of the periphery of the fourth lens element, the image-side surface of the fifth lens element has a concave part in a vicinity of the optical axis, and the sixth lens element has negative refractive power.

20 Claims, 25 Drawing Sheets

Related U.S. Application Data

May 4, 2020, now Pat. No. 11,231,564, which is a continuation of application No. 16/594,426, filed on Oct. 7, 2019, now Pat. No. 10,684,451, which is a continuation of application No. 16/029,330, filed on Jul. 6, 2018, now Pat. No. 10,473,898, which is a continuation of application No. 15/092,417, filed on Apr. 6, 2016, now Pat. No. 10,048,467, which is a continuation of application No. 14/521,461, filed on Oct. 23, 2014, now Pat. No. 9,335,518.

| First Example | | | | | | | | |
|---|---|---|---|---|---|---|---|---|
| EFL(Effective Focal Length)= 1.669 mm., HFOV(Half Field Of View)= 66.5 deg., Fno= 2.40 | | | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 104.959 | 0.319110142 | 1.53504875 | 55.71236184 | -5.022355 | plastic |
| 12 | | 2.625684 | 0.202527037 | | | | |
| 21 | Second Lens | 1.034314 | 0.385826125 | 1.63972877 | 23.52879847 | -6.737022 | plastic |
| 22 | | 0.713218 | 0.433733863 | | | | |
| 31 | Third Lens | 1.816216 | 0.266088752 | 1.54410197 | 56.11429148 | 2.163116 | plastic |
| 32 | | -3.20151 | -0.001508787 | | | | |
| 80 | Ape. Stop | infinity | 0.114760529 | | | | |
| 41 | Fourth Lens | 2.207155 | 0.610405487 | 1.54410197 | 56.11429148 | 1.373052 | plastic |
| 42 | | -1.02426 | 0.219084387 | | | | |
| 51 | Fifth Lens | -5.35269 | 0.279651917 | 1.63972877 | 23.52879847 | -2.327656 | plastic |
| 52 | | 2.127414 | 0.170079536 | | | | |
| 61 | Sixth Lens | 14.50226 | 0.514397006 | 1.53112958 | 55.74414132 | -7.581025 | plastic |
| 62 | | 3.120598 | 0.2 | | | | |
| 72 | Filter | infinity | 0.21 | 1.51680004 | 64.16733624 | | |
| | Filter -Image Plane | infinity | 0.137843682 | | | | |
| 71 | Image Plane | infinity | | | | | |

FIG. 18

| No. | K | a4 | a6 | a8 | a10 | a12 | a14 | a16 |
|---|---|---|---|---|---|---|---|---|
| First object-side surface 11 | | | | | | | | |
| First image-side surface 12 | -1.6873 | 0.057699 | 0.049587 | 0.038087 | 0 | 0 | 0 | 0 |
| Second object-side surface 21 | -0.0688 | -0.17524 | -0.14676 | -0.0007 | 0 | 0 | 0 | 0 |
| Second image-side surface 22 | 0.038 | -0.33971 | -0.66725 | 0.249482 | 0 | 0 | 0 | 0 |
| Third object-side surface 31 | -0.02215 | -0.18769 | -0.36386 | -0.26711 | 0 | 0 | 0 | 0 |
| Third image-side surface 32 | -4.09508 | -0.24199 | -0.47218 | 0.471704 | 0 | 0 | 0 | 0 |
| Fourth object-side surface 41 | -0.14036 | -0.09607 | 0.011165 | -0.4858 | 1.375304 | 0 | 0 | 0 |
| Fourth image-side surface 42 | 0.116386 | 0.242246 | 0.145358 | -1.83994 | 2.48602 | 0 | 0 | 0 |
| Fifth object-side surface 51 | 11.56162 | -0.15947 | -0.02365 | -1.52985 | 1.056591 | 0 | 0 | 0 |
| Fifth image-side surface 52 | 0.721204 | -0.09983 | -0.0407 | 0.013642 | 0.032239 | 0 | 0 | 0 |
| Sixth object-side surface 61 | 203.4833 | 0.019737 | -0.00796 | 0.013287 | -0.004483 | -0.00111 | -0.03025 | 0.006128 |
| Sixth image-side surface 62 | 0.480051 | -0.14794 | 0.009272 | 0.013601 | 6.43E-07 | -0.00119 | -0.00139 | 0.000321 |

FIG. 19

| Second Example | | | | | | | |
|---|---|---|---|---|---|---|---|
| EFL(Effective Focal Length)= 1.597 mm., HFOV(Half Field Of View)= 66.5 deg., Fno= 2.40 | | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 47.72223 | 0.469433636 | 1.53504875 | 55.71236184 | -5.806641 | plastic |
| 12 | | 2.915835 | 0.65481226 | | | | |
| 21 | Second Lens | 1.048284 | 0.288665094 | 1.63972877 | 23.52879847 | -5.223392 | plastic |
| 22 | | 0.713116 | 0.425630962 | | | | |
| 31 | Third Lens | 1.798787 | 0.278633104 | 1.54410197 | 56.11429148 | 2.171636 | plastic |
| 32 | | -3.28759 | -0.001508787 | | | | |
| 80 | Ape. Stop | infinity | 0.114760529 | | | | |
| 41 | Fourth Lens | 2.210858 | 0.587482387 | 1.54410197 | 56.11429148 | 1.369094 | plastic |
| 42 | | -1.02324 | 0.206978137 | | | | |
| 51 | Fifth Lens | -4.37897 | 0.36367438 | 1.63972877 | 23.52879847 | -1.988335 | plastic |
| 52 | | 1.870972 | 0.226511307 | | | | |
| 61 | Sixth Lens | 14.39425 | 0.460630586 | 1.53112958 | 55.74414132 | -8.060436 | plastic |
| 62 | | 3.271235 | 0.2 | | | | |
| 72 | Filter | infinity | 0.21 | 1.51680004 | 64.16733624 | | |
| | Filter -Image Plane | infinity | 0.09854138 | | | | |
| 71 | Image Plane | infinity | | | | | |

FIG. 20

| No. | K | a4 | a6 | a8 | a10 | a12 | a14 | a16 |
|---|---|---|---|---|---|---|---|---|
| First object-side surface 11 | | | | | | | | |
| First image-side surface 12 | -0.82613 | 0.062168 | 0.005167 | 0.028665 | 0 | 0 | 0 | 0 |
| Second object-side surface 21 | -0.07576 | -0.17622 | -0.18917 | 0.040502 | 0 | 0 | 0 | 0 |
| Second image-side surface 22 | 0.03837 | -0.33839 | -0.6153 | 0.274554 | 0 | 0 | 0 | 0 |
| Third object-side surface 31 | -0.00459 | -0.18727 | -0.36716 | -0.21778 | 0 | 0 | 0 | 0 |
| Third image-side surface 32 | -3.8997 | -0.24268 | -0.47352 | 0.424278 | 0 | 0 | 0 | 0 |
| Fourth object-side surface 41 | -0.0719 | -0.09525 | 0.009284 | -0.57187 | 1.390339 | 0 | 0 | 0 |
| Fourth image-side surface 42 | 0.124242 | 0.241029 | 0.130519 | -1.84502 | 2.57047 | 0 | 0 | 0 |
| Fifth object-side surface 51 | 9.529253 | -0.15688 | -0.09587 | -1.42381 | 1.528855 | 0 | 0 | 0 |
| Fifth image-side surface 52 | 0.680274 | -0.1024 | -0.02393 | 0.02459 | 0.045628 | 0 | 0 | 0 |
| Sixth object-side surface 61 | 179.8766 | 0.050417 | -0.01092 | 0.009467 | -0.006689 | -0.00109 | -0.02855 | 0.011888 |
| Sixth image-side surface 62 | 5.153402 | -0.13831 | 0.007735 | 0.020218 | 0.001373 | -0.00182 | -0.00271 | -0.00106 |

FIG. 21

| Third Example | | | | | | | |
|---|---|---|---|---|---|---|---|
| EFL(Effective Focal Length)= 2.100 mm., HFOV(Half Field Of View)= 66.5 deg., Fno= 2.40 | | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 22.20214 | 0.413362588 | 1.53504875 | 55.71236184 | -5.781805 | plastic |
| 12 | | 2.705301 | 0.027630129 | | | | |
| 21 | Second Lens | 1.150625 | 0.250076824 | 1.63972877 | 23.52879847 | -5.854275 | plastic |
| 22 | | 0.806649 | 0.262169248 | | | | |
| 31 | Third Lens | 1.707119 | 1.394729782 | 1.54410197 | 56.11429148 | 2.357539 | plastic |
| 32 | | -3.72167 | -0.001508787 | | | | |
| 80 | Ape. Stop | infinity | 0.114760529 | | | | |
| 41 | Fourth Lens | 2.326856 | 0.631171397 | 1.54410197 | 56.11429148 | 1.444789 | plastic |
| 42 | | -1.07897 | 0.142711917 | | | | |
| 51 | Fifth Lens | -2.98189 | 0.32288225 | 1.63972877 | 23.52879847 | -2.368319 | plastic |
| 52 | | 3.260677 | 0.35891928 | | | | |
| 61 | Sixth Lens | 12.95054 | 0.250076806 | 1.53112958 | 55.74414132 | -6.987739 | plastic |
| 62 | | 2.872601 | 0.2 | | | | |
| 72 | Filter | infinity | 0.21 | 1.51680004 | 64.16733624 | | |
| | Filter -Image Plane | infinity | 0.455773258 | | | | |
| 71 | Image Plane | infinity | | | | | |

FIG. 22

| No. | K | a4 | a6 | a8 | a10 | a12 | a14 | a16 |
|---|---|---|---|---|---|---|---|---|
| First object-side surface 11 | | | | | | | | |
| First image-side surface 12 | -2.51952 | 0.050187 | 0.072143 | 0.009647 | 0 | 0 | 0 | 0 |
| Second object-side surface 21 | -0.15832 | -0.15144 | -0.1611 | 0.107114 | 0 | 0 | 0 | 0 |
| Second image-side surface 22 | -0.14682 | -0.37514 | -0.39156 | 0.12079 | 0 | 0 | 0 | 0 |
| Third object-side surface 31 | 1.300991 | -0.141 | -0.20505 | 0.218967 | 0 | 0 | 0 | 0 |
| Third image-side surface 32 | -26.7844 | -0.19353 | -0.34323 | 0.794979 | 0 | 0 | 0 | 0 |
| Fourth object-side surface 41 | -3.25351 | -0.12676 | -0.05325 | -0.42927 | 0.566293 | 0 | 0 | 0 |
| Fourth image-side surface 42 | -0.01521 | 0.281594 | 0.126835 | -2.10683 | 2.044236 | 0 | 0 | 0 |
| Fifth object-side surface 51 | -27.5904 | -0.15786 | -0.05062 | -1.46524 | 1.370614 | 0 | 0 | 0 |
| Fifth image-side surface 52 | -6.62683 | -0.15786 | -0.07436 | -0.0145 | -0.021502 | 0 | 0 | 0 |
| Sixth object-side surface 61 | -4164.1 | -0.02135 | -0.03048 | -0.00042 | -0.005883 | 0.008733 | -0.0319 | 0.009378 |
| Sixth image-side surface 62 | 2.974973 | -0.13491 | -0.00538 | 0.013829 | 0.000924 | -0.00141 | -0.00136 | 0.000314 |

FIG. 23

| Fourth Example | | | | | | | |
|---|---|---|---|---|---|---|---|
| EFL(Effective Focal Length)= 2.614 mm., HFOV(Half Field Of View)= 66.5 deg., Fno= 2.40 | | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 109665.6 | 0.250000686 | 1.53504875 | 55.71236184 | 155.4209 | plastic |
| 12 | | -83.4931 | 0.476945739 | | | | |
| 21 | Second Lens | 1.313533 | 0.220922502 | 1.63972877 | 23.52879847 | -5.288783 | plastic |
| 22 | | 0.885684 | 0.251186006 | | | | |
| 31 | Third Lens | 2.053454 | 0.500920625 | 1.54410197 | 56.11429148 | 3.113224 | plastic |
| 32 | | -9.01446 | 0.172448712 | | | | |
| 80 | Ape. Stop | infinity | -0.01444175 | | | | |
| 41 | Fourth Lens | 2.090723 | 0.540658232 | 1.54410197 | 56.11429148 | 1.834271 | plastic |
| 42 | | -1.74647 | 0.213355567 | | | | |
| 51 | Fifth Lens | -5.872 | 0.281108959 | 1.63972877 | 23.52879847 | -3.762127 | plastic |
| 52 | | 4.208554 | 0.408945217 | | | | |
| 61 | Sixth Lens | -4.80903 | 0.560005393 | 1.53112958 | 55.74414132 | -3.184216 | plastic |
| 62 | | 2.727933 | 0.2 | | | | |
| 72 | Filter | infinity | 0.21 | 1.51680004 | 64.16733624 | | |
| | Filter -Image Plane | infinity | 0.240765731 | | | | |
| 71 | Image Plane | infinity | | | | | |

FIG. 24

| No. | K | a4 | a6 | a8 | a10 | a12 | a14 | a16 |
|---|---|---|---|---|---|---|---|---|
| First object-side surface 11 | | | | | | | | |
| First image-side surface 12 | 0 | 0.050161 | -0.00499 | 0 | 0 | 0 | 0 | 0 |
| Second object-side surface 21 | 0 | -0.31218 | -0.01274 | 0 | 0 | 0 | 0 | 0 |
| Second image-side surface 22 | 0 | -0.55181 | 0.065437 | 0 | 0 | 0 | 0 | 0 |
| Third object-side surface 31 | 0 | -0.13236 | 0.089589 | 0.012393 | 0 | 0 | 0 | 0 |
| Third image-side surface 32 | 0 | -0.25464 | 0.129567 | -0.14084 | 0 | 0 | 0 | 0 |
| Fourth object-side surface 41 | 0 | -0.16373 | -0.00867 | 0.016139 | -0.490744 | 0 | 0 | 0 |
| Fourth image-side surface 42 | 0 | -0.04196 | 0.032129 | -0.43281 | 0.218928 | 0 | 0 | 0 |
| Fifth object-side surface 51 | 0 | -0.23221 | -0.08126 | -0.06353 | 0.291654 | 0 | 0 | 0 |
| Fifth image-side surface 52 | 0 | -0.08729 | -0.02053 | 0.066683 | -0.017925 | 0 | 0 | 0 |
| Sixth object-side surface 61 | 0 | -0.09614 | 0.14164 | -0.05363 | -0.010626 | -0.00153 | 0.006626 | -0.00207 |
| Sixth image-side surface 62 | 0 | -0.22428 | 0.110406 | -0.04512 | 0.01074 | -0.00027 | -0.00048 | 6.31E-05 |

FIG. 25

| Fifth Example | | | | | | | |
|---|---|---|---|---|---|---|---|
| EFL(Effective Focal Length)= 1.919 mm., HFOV(Half Field Of View)= 66.5 deg., Fno= 2.40 | | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | -4.7247 | 0.246869067 | 1.53504875 | 55.71236184 | -2.571857 | plastic |
| 12 | | 1.986111 | 0.246309025 | | | | |
| 21 | Second Lens | 1.439096 | 0.248461326 | 1.63972877 | 23.52879847 | -7.356932 | plastic |
| 22 | | 1.029341 | 0.210195587 | | | | |
| 31 | Third Lens | 3.53162 | 0.532712368 | 1.54410197 | 56.11429148 | 2.362342 | plastic |
| 32 | | -1.9234 | 0.149638098 | | | | |
| 80 | Ape. Stop | infinity | -0.070371996 | | | | |
| 41 | Fourth Lens | 1.388462 | 1.594824495 | 1.54410197 | 56.11429148 | 1.397827 | plastic |
| 42 | | -1.00712 | 0.072450508 | | | | |
| 51 | Fifth Lens | -1.90064 | 0.247547354 | 1.63972877 | 23.52879847 | -1.705022 | plastic |
| 52 | | 2.738855 | 0.078437692 | | | | |
| 61 | Sixth Lens | 9.495605 | 0.560005393 | 1.53112958 | 55.74414132 | -6.542374 | plastic |
| 62 | | 2.497721 | 0.2 | | | | |
| 72 | Filter | infinity | 0.21 | 1.51680004 | 64.16733624 | | |
| | Filter -Image Plane | infinity | 0.367883079 | | | | |
| 71 | Image Plane | infinity | | | | | |

FIG. 26

| No. | K | a4 | a6 | a8 | a10 | a12 | a14 | a16 |
|---|---|---|---|---|---|---|---|---|
| First object-side surface 11 | | | | | | | | |
| First image-side surface 12 | 0 | 0.052179 | 0.17075 | 0 | 0 | 0 | 0 | 0 |
| Second object-side surface 21 | 0 | -0.38537 | 0.16858 | 0 | 0 | 0 | 0 | 0 |
| Second image-side surface 22 | 0 | -0.42185 | 0.076603 | 0 | 0 | 0 | 0 | 0 |
| Third object-side surface 31 | 0 | 0.134536 | -0.0895 | -0.01747 | 0 | 0 | 0 | 0 |
| Third image-side surface 32 | 0 | -0.00705 | 0.007842 | -0.07451 | 0 | 0 | 0 | 0 |
| Fourth object-side surface 41 | 0 | -0.03553 | -0.04774 | 0.153716 | -0.285692 | 0 | 0 | 0 |
| Fourth image-side surface 42 | 0 | 0.48864 | -0.56812 | 0.535503 | -0.295637 | 0 | 0 | 0 |
| Fifth object-side surface 51 | 0 | -0.05754 | -0.2965 | -0.15245 | -0.01716 | 0 | 0 | 0 |
| Fifth image-side surface 52 | 0 | -0.05051 | 0.008716 | -0.00574 | 0.004104 | 0 | 0 | 0 |
| Sixth object-side surface 61 | 0 | 0.009884 | 0.073334 | 0.013069 | -0.043397 | -0.00385 | 0.025274 | -0.00886 |
| Sixth image-side surface 62 | 0 | -0.40558 | 0.288924 | -0.14172 | 0.000452 | 0.037415 | 0.01733 | -0.0141 |

FIG. 27

| Sixth Example | | | | | | | |
|---|---|---|---|---|---|---|---|
| EFL(Effective Focal Length)= 1.723 mm., HFOV(Half Field Of View)= 66.5 deg., Fno= 2.40 | | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 80.24852 | 0.250499849 | 1.53504875 | 55.71236184 | -4.615373 | plastic |
| 12 | | 2.400705 | 0.202720741 | | | | |
| 21 | Second Lens | 1.091731 | 0.58914614 | 1.63972877 | 23.52879847 | -9.347456 | plastic |
| 22 | | 0.72877 | 0.414443012 | | | | |
| 31 | Third Lens | 1.798473 | 0.263615904 | 1.54410197 | 56.11429148 | 2.11434 | plastic |
| 32 | | -3.05592 | -0.001508787 | | | | |
| 80 | Ape. Stop | infinity | 0.114760529 | | | | |
| 41 | Fourth Lens | 2.119243 | 0.596856234 | 1.54410197 | 56.11429148 | 1.364526 | plastic |
| 42 | | -1.03451 | 0.217800731 | | | | |
| 51 | Fifth Lens | -5.37686 | 0.270326179 | 1.63972877 | 23.52879847 | -2.331589 | plastic |
| 52 | | 2.127067 | 0.168758119 | | | | |
| 61 | Sixth Lens | 14.48153 | 0.515786143 | 1.53112958 | 55.74414132 | -7.995836 | plastic |
| 62 | | 3.251349 | 0.2 | | | | |
| 72 | Filter | infinity | 0.21 | 1.51680004 | 64.16733624 | | |
| | Filter -Image Plane | infinity | 0.143011827 | | | | |
| 71 | Image Plane | infinity | | | | | |

FIG. 28

| No. | K | a4 | a6 | a8 | a10 | a12 | a14 | a16 |
|---|---|---|---|---|---|---|---|---|
| First object-side surface 11 | | | | | | | | |
| First image-side surface 12 | -4.85505 | 0.038892 | 0.031796 | 0.030176 | 0 | 0 | 0 | 0 |
| Second object-side surface 21 | -0.05792 | -0.16891 | -0.13679 | -0.00195 | 0 | 0 | 0 | 0 |
| Second image-side surface 22 | 0.03238 | -0.34292 | -0.76185 | 0.234751 | 0 | 0 | 0 | 0 |
| Third object-side surface 31 | 0.03888 | -0.19253 | -0.42818 | -0.32693 | 0 | 0 | 0 | 0 |
| Third image-side surface 32 | -8.82372 | -0.22876 | -0.45405 | 0.380308 | 0 | 0 | 0 | 0 |
| Fourth object-side surface 41 | 0.114051 | -0.09265 | 0.011099 | -0.57338 | 1.465889 | 0 | 0 | 0 |
| Fourth image-side surface 42 | 0.162875 | 0.228909 | 0.114469 | -1.83312 | 2.535528 | 0 | 0 | 0 |
| Fifth object-side surface 51 | 2.143178 | -0.14991 | -0.02611 | -1.53039 | 1.089835 | 0 | 0 | 0 |
| Fifth image-side surface 52 | 0.74511 | -0.10032 | -0.03684 | 0.014567 | 0.030607 | 0 | 0 | 0 |
| Sixth object-side surface 61 | 199.4869 | 0.025469 | -0.01197 | 0.011654 | -0.005702 | -0.00153 | -0.03015 | 0.006235 |
| Sixth image-side surface 62 | -4.42513 | -0.14088 | 0.029777 | 0.013705 | -0.000305 | -0.00101 | -0.00104 | 0.00076 |

FIG. 29

| Seventh Example | | | | | | | |
|---|---|---|---|---|---|---|---|
| EFL(Effective Focal Length)= 1.772 mm., HFOV(Half Field Of View)= 66.5 deg., Fno= 2.40 | | | | | | | |
| No. | | Curvature Radius | Ape. Stop Distance Lens Thickness Air Gap | Refractive Index | Abbe No. | Focal Length | Material |
| | Object | infinity | infinity | | | | |
| 11 | First Lens | 16.00621 | 0.250499463 | 1.53504875 | 55.71236184 | -6.836061 | plastic |
| 12 | | 2.968879 | 0.018768853 | | | | |
| 21 | Second Lens | 1.042246 | 0.299698483 | 1.63972877 | 23.52879847 | -5.915212 | plastic |
| 22 | | 0.726258 | 0.568883067 | | | | |
| 31 | Third Lens | 1.98803 | 0.365397947 | 1.54410197 | 56.11429148 | 2.643409 | plastic |
| 32 | | -4.92361 | 0.010749861 | | | | |
| 80 | Ape. Stop | infinity | 0.114760529 | | | | |
| 41 | Fourth Lens | 2.255612 | 0.560527589 | 1.54410197 | 56.11429148 | 1.357079 | plastic |
| 42 | | -1.00645 | 0.164166455 | | | | |
| 51 | Fifth Lens | -5.10066 | 0.296527015 | 1.63972877 | 23.52879847 | -2.371182 | plastic |
| 52 | | 2.232113 | 0.203827138 | | | | |
| 61 | Sixth Lens | 7.711789 | 0.749080984 | 1.53112958 | 55.74414132 | -7.895896 | plastic |
| 62 | | 2.630313 | 0.2 | | | | |
| 72 | Filter | infinity | 0.21 | 1.51680004 | 64.16733624 | | |
| | Filter -Image Plane | infinity | 0.13763069 | | | | |
| 71 | Image Plane | infinity | | | | | |

FIG. 30

| No. | K | a4 | a6 | a8 | a10 | a12 | a14 | a16 |
|---|---|---|---|---|---|---|---|---|
| First object-side surface 11 | | | | | | | | |
| First image-side surface 12 | 0.419612 | 0.071255 | 0.092151 | -0.00431 | 0 | 0 | 0 | 0 |
| Second object-side surface 21 | -0.02578 | -0.16959 | -0.16918 | 0.054932 | 0 | 0 | 0 | 0 |
| Second image-side surface 22 | 0.007127 | -0.36843 | -0.63892 | -0.04104 | 0 | 0 | 0 | 0 |
| Third object-side surface 31 | -0.14743 | -0.18648 | -0.33401 | -0.24527 | 0 | 0 | 0 | 0 |
| Third image-side surface 32 | -2.34905 | -0.24302 | -0.50573 | 0.646724 | 0 | 0 | 0 | 0 |
| Fourth object-side surface 41 | -0.24549 | -0.10057 | 0.000747 | -0.51572 | 0.857381 | 0 | 0 | 0 |
| Fourth image-side surface 42 | -0.00632 | 0.273606 | 0.23101 | -2.04363 | 2.119885 | 0 | 0 | 0 |
| Fifth object-side surface 51 | -6.09468 | -0.14749 | 0.05477 | -1.53583 | 1.011104 | 0 | 0 | 0 |
| Fifth image-side surface 52 | 0.399444 | -0.10408 | -0.01817 | -0.03008 | 0.011024 | 0 | 0 | 0 |
| Sixth object-side surface 61 | 45.50553 | 0.047773 | -0.00692 | -0.01328 | -0.003064 | 0.008994 | -0.02247 | 0.001954 |
| Sixth image-side surface 62 | 2.19001 | -0.09616 | -0.00896 | 0.008572 | 0.004119 | -0.00039 | -0.00167 | -3.4E-05 |

FIG. 31

| | Example 1 | Example 2 | Example 3 | Example 4 | Example 5 | Example 6 | Example 7 |
|---|---|---|---|---|---|---|---|
| T1 | 0.319 | 0.469 | 0.413 | 0.250 | 0.247 | 0.250 | 0.250 |
| G12 | 0.203 | 0.655 | 0.028 | 0.477 | 0.246 | 0.203 | 0.019 |
| T2 | 0.386 | 0.289 | 0.250 | 0.221 | 0.248 | 0.589 | 0.300 |
| G23 | 0.434 | 0.426 | 0.262 | 0.251 | 0.210 | 0.414 | 0.569 |
| T3 | 0.264 | 0.277 | 1.393 | 0.673 | 0.683 | 0.262 | 0.376 |
| G34 | 0.113 | 0.113 | 0.113 | 0.158 | 0.080 | 0.113 | 0.126 |
| T4 | 0.610 | 0.587 | 0.631 | 0.541 | 1.595 | 0.597 | 0.561 |
| G45 | 0.219 | 0.207 | 0.143 | 0.213 | 0.072 | 0.218 | 0.164 |
| T5 | 0.280 | 0.364 | 0.323 | 0.281 | 0.248 | 0.270 | 0.297 |
| G56 | 0.170 | 0.227 | 0.359 | 0.409 | 0.078 | 0.169 | 0.204 |
| T6 | 0.514 | 0.461 | 0.250 | 0.560 | 0.560 | 0.516 | 0.749 |
| G6F | 0.200 | 0.200 | 0.200 | 0.200 | 0.200 | 0.200 | 0.200 |
| TF | 0.210 | 0.210 | 0.210 | 0.210 | 0.210 | 0.210 | 0.210 |
| GFP | 0.138 | 0.099 | 0.456 | 0.241 | 0.368 | 0.143 | 0.138 |
| EFL | 1.670 | 1.597 | 2.101 | 2.615 | 1.919 | 1.724 | 1.772 |
| ALT | 2.373 | 2.447 | 3.260 | 2.526 | 3.581 | 2.484 | 2.533 |
| AAG | 1.139 | 1.628 | 0.905 | 1.508 | 0.686 | 1.117 | 1.082 |
| BFL | 0.548 | 0.509 | 0.866 | 0.651 | 0.778 | 0.553 | 0.548 |
| TTL | 4.060 | 4.584 | 5.031 | 4.685 | 5.045 | 4.154 | 4.163 |
| (G12+G34)/T6 | 0.615 | 1.666 | 0.564 | 1.134 | 0.582 | 0.612 | 0.194 |
| T2/T3 | 1.462 | 1.043 | 0.179 | 0.328 | 0.363 | 2.248 | 0.798 |
| EFL/G23 | 3.848 | 3.749 | 8.019 | 10.418 | 9.138 | 4.164 | 3.114 |
| EFL/AAG | 1.466 | 0.981 | 2.322 | 1.734 | 2.797 | 1.543 | 1.638 |
| AAG/BFL | 2.078 | 3.198 | 1.045 | 2.316 | 0.882 | 2.020 | 1.974 |
| EFL/T2 | 4.326 | 5.526 | 8.404 | 11.833 | 7.738 | 2.927 | 5.907 |
| BFL/(G34+G45) | 1.651 | 1.591 | 3.383 | 1.755 | 5.118 | 1.671 | 1.890 |
| BFL/T1 | 1.718 | 1.085 | 2.097 | 2.604 | 3.150 | 2.212 | 2.192 |
| BFL/T2 | 1.420 | 1.761 | 3.464 | 2.946 | 3.137 | 0.939 | 1.827 |
| AAG/T3 | 4.314 | 5.877 | 0.650 | 2.241 | 1.004 | 4.263 | 2.878 |
| EFL/T1 | 5.235 | 3.405 | 5.087 | 10.460 | 7.769 | 6.896 | 7.088 |
| AAG/T4 | 1.867 | 2.773 | 1.434 | 2.787 | 0.430 | 1.871 | 1.929 |
| T4/T2 | 1.580 | 2.031 | 2.524 | 2.448 | 6.431 | 1.014 | 1.870 |
| T6/T2 | 1.332 | 1.595 | 1.000 | 2.534 | 2.258 | 0.876 | 2.497 |

FIG. 32

OPTICAL IMAGING LENS AND ELECTRONIC DEVICE COMPRISING THE SAME

CROSS-REFERENCES TO RELATED APPLICATIONS

This application is a continuation of U.S. patent application Ser. No. 18/219,834, filed Jul. 10, 2023, which is a continuation of U.S. patent application Ser. No. 17/858,476, filed Jul. 6, 2022, now U.S. Pat. No. 11,740,441, which is a continuation of U.S. patent application Ser. No. 16/915,376, filed Jun. 29, 2020, now U.S. Pat. No. 11,415,782, which is a continuation of U.S. patent application Ser. No. 16/866,282, filed May 4, 2020, now U.S. Pat. No. 11,231,564, which is a continuation of U.S. patent application Ser. No. 16/594,426, filed on Oct. 7, 2019, now U.S. Pat. No. 10,684,451, which is a continuation of U.S. patent application Ser. No. 16/029,330, filed on Jul. 6, 2018, now U.S. Pat. No. 10,473,898, which is a continuation of U.S. patent application Ser. No. 15/092,417, filed on Apr. 6, 2016, now U.S. Pat. No. 10,048,467, which is a continuation of U.S. patent application Ser. No. 14/521,461, filed on Oct. 23, 2014, now U.S. Pat. No. 9,335,518, which claims priority from P.R.C. patent application No. 201410366295.4, filed on Jul. 29, 2014, the contents of which are hereby incorporated by reference in their entirety for all purposes.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of six lens elements and an electronic device which includes such optical imaging lens set of six lens elements.

2. Description of the Prior Art

In recent years, the popularity of mobile phones and digital cameras makes photography modules (including optical imaging lens set, holder and sensor, etc) well developed. Mobile phones and digital cameras become lighter and thinner, so that the miniaturization demands of photography modules get higher and higher. As the charge coupled device (CCD) or complementary metal-oxide semiconductor (CMOS) technologies advance, the size of the photography modules can be shrunk too, but these photography modules still need to maintain good imaging quality.

Conventional optical imaging lens sets are mostly with only four lens elements, and since they have fewer lens elements, the total length of the optical imaging lens set is relatively short. However, as the requirements of good imaging quality increase, the conventional optical imaging lens set of four lens elements can hardly satisfy these requirements. U.S. Pat. Nos. 7,663,814 and 8,040,618 disclose an optical imaging lens set of six lens elements respectively, and all of the total length (the distance between the first object surface of the first lens element to an image plane) of the optical imaging lens sets are over 21 mm. The size of the optical imaging lens set is too big to satisfy the specification requirements of consumer electronics products. Therefore, a novel optical imaging lens set with small total length and good imaging quality is needed.

SUMMARY OF THE INVENTION

In light of the above, the present invention proposes an optical imaging lens set that is lightweight has a low production cost, an enlarged half of field of view, a high resolution and high image quality. The optical imaging lens set of six lens elements of the present invention has a first lens element, a second lens element, a third lens element, a fourth lens element, a fifth lens element and a sixth lens element sequentially from an object side to an image side along an optical axis.

The present invention provides an optical imaging lens set, from an object side toward an image side in order along an optical axis comprising: a first lens element, a second lens element, a third lens element, a fourth lens element, a fifth lens element and a sixth lens element. The first lens element has an image-side surface with a concave part in a vicinity of its periphery. The second lens element has an image-side surface with a concave part in a vicinity of the optical axis. The third lens element has positive refractive power. The fourth lens element has an object-side surface with a convex part in a vicinity of its circular periphery. The fifth lens element has an object-side surface with a concave part in a vicinity of the optical axis. The sixth lens element having an image-side surface with a concave part in a vicinity of the optical axis. Wherein the optical imaging lens set does not include any lens element with refractive power other than said first, second, third, fourth, fifth and sixth lens elements.

In the optical imaging lens set of six lens elements of the present invention, an air gap G12 along the optical axis is disposed between the first lens element and the second lens element, an air gap G23 along the optical axis is disposed between the second lens element and the third lens element, an air gap G34 along the optical axis is disposed between the third lens element and the fourth lens element, an air gap G45 along the optical axis is disposed between the fourth lens element and the fifth lens element, an air gap G56 along the optical axis is disposed between the fifth lens element and the sixth lens element, and the sum of total five air gaps between adjacent lens elements from the first lens element to the sixth lens element along the optical axis is AAG, AAG=G12+G23+G34+G45+G56.

In the optical imaging lens set of six lens elements of the present invention, the first lens element has a first lens element thickness T1 along the optical axis, the second lens element has a second lens element thickness T2 along the optical axis, the third lens element has a third lens element thickness T3 along the optical axis, the fourth lens element has a fourth lens element thickness T4 along the optical axis, the fifth lens element has a fifth lens element thickness T5 along the optical axis, the sixth lens element has a sixth lens element thickness T6 along the optical axis, and the total thickness of all the lens elements in the optical imaging lens set along the optical axis is ALT, ALT=T1+T2+T3+T4+T5+T6.

In addition, the distance between the image-side surface of the sixth lens element to an image plane along the optical axis is BFL (back focal length); the effective focal length of the optical imaging lens set is EFL.

In the optical imaging lens set of six lens elements of the present invention, the relationship $(G12+G34)/T6 \leq 1.7$ is satisfied.

In the optical imaging lens set of six lens elements of the present invention, the relationship $T2/T3 \leq 1.5$ is satisfied.

In the optical imaging lens set of six lens elements of the present invention, the relationship $3 \leq EFL/G23 \leq 11$ is satisfied.

In the optical imaging lens set of six lens elements of the present invention, the relationship 0.9≤EFL/AAG≤2.6 is satisfied.

In the optical imaging lens set of six lens elements of the present invention, the relationship AAG/BFL≤2.1 is satisfied.

In the optical imaging lens set of six lens elements of the present invention, the relationship 2.8≤EFL/T2 is satisfied.

In the optical imaging lens set of six lens elements of the present invention, the relationship 1.88≤BFL/(G34+G45)≤6 is satisfied.

In the optical imaging lens set of six lens elements of the present invention, the relationship AAG/BFL≤2.1 is satisfied.

In the optical imaging lens set of six lens elements of the present invention, the relationship 1.5≤BFL/T1 is satisfied.

In the optical imaging lens set of six lens elements of the present invention, the relationship 1.4≤BFL/T2 is satisfied.

In the optical imaging lens set of six lens elements of the present invention, the relationship 1.9≤BFL/T2 is satisfied.

In the optical imaging lens set of six lens elements of the present invention, the relationship AAG/T3≤3.3 is satisfied.

In the optical imaging lens set of six lens elements of the present invention, the relationship 4.7≤EFL/T1 is satisfied.

In the optical imaging lens set of six lens elements of the present invention, the relationship 1.1≤T6/T2 is satisfied.

In the optical imaging lens set of six lens elements of the present invention, the relationship AAG/T4≤2.8 is satisfied.

In the optical imaging lens set of six lens elements of the present invention, the relationship 3.5≤EFL/G23≤11 is satisfied.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, a substrate for the installation of the module housing unit, and an image sensor disposed on the substrate and at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows the optical data of the seventh example of the optical imaging lens set.

FIG. 31 shows the aspheric surface data of the seventh example.

FIG. 32 shows some important ratios in the examples.

DETAILED DESCRIPTION OF THE INVENTION

Figure 15:
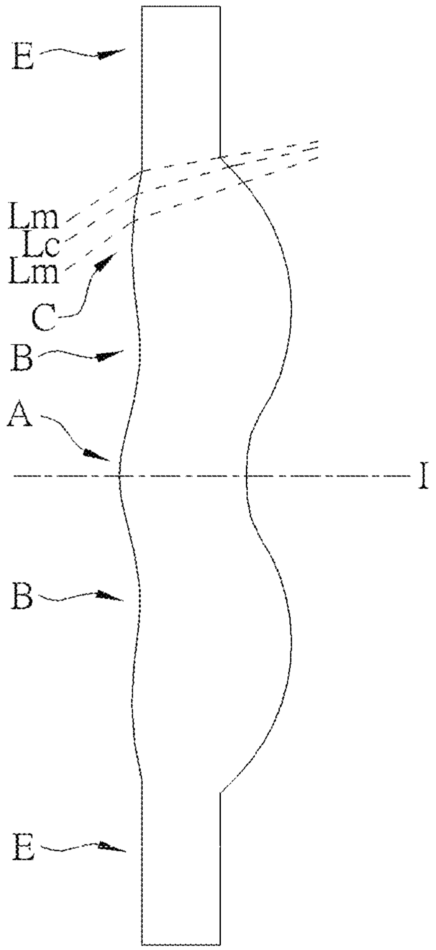
FIG. 15 illustrates exemplificative shapes of the optical imaging lens element of the present invention.

Before the detailed description of the present invention, the first thing to be noticed is that in the present invention, similar (not necessarily identical) elements are labeled as the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part" refers to the part is more concave/convex in a direction parallel with the optical axis to be compared with an outer region next to the region. Taking FIG. 15 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 15. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11 and 13.

Figure 1:
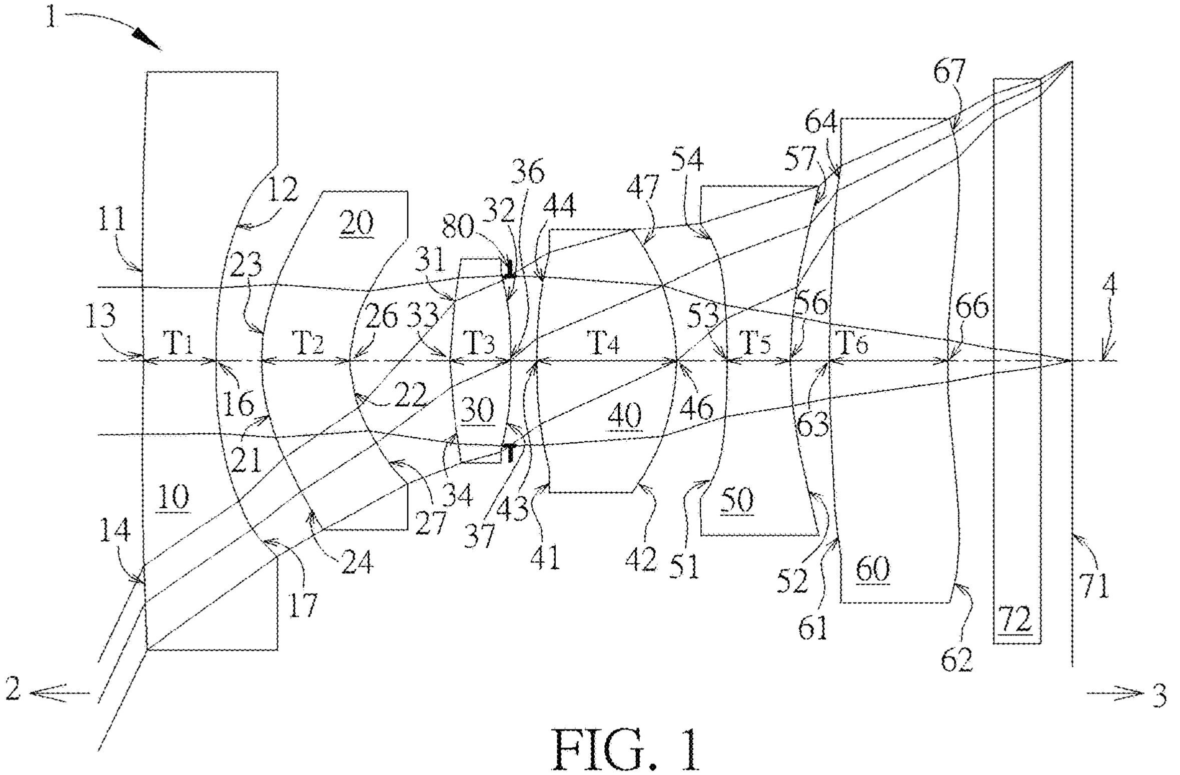
FIG. 1 illustrates a first example of the optical imaging lens set of the present invention.

As shown in FIG. 1, the optical imaging lens set 1 of six lens elements of the present invention, sequentially located from an object side 2 (where an object is located) to an image side 3 along an optical axis 4, has a first lens element 10, a second lens element 20, a third lens element 30, a fourth lens element 40, a fifth lens element 50, a sixth lens element 60, a filter 72 and an image plane 71. Generally speaking, the first lens element 10, the second lens element 20, the third lens element 30, the fourth lens element 40, the fifth lens element 50 and the sixth lens element 60 maybe made of a transparent plastic material and each has an appropriate refractive power, but the present invention is not limited to this. There are exclusively six lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the third lens element 30 and the fourth lens element 40. When light emitted or reflected by an object (not shown) which is located at the object side 2 enters the optical imaging lens set 1 of the present invention, it forms a clear and sharp image on the image plane 71 at the image side 3 after passing through the first lens element 10, the second lens element 20, the third lens element 30, the aperture stop 80, the fourth lens element 40, the fifth lens element 50, the sixth lens element 60 and the filter 72.

In the embodiments of the present invention, the optional filter 72 may be a filter of various suitable functions, for example, the filter 72 may be an infrared cut filter (IR cut filter), placed between the sixth lens element 60 and the image plane 71. The filter 72 is made of glass.

Each lens element in the optical imaging lens set 1 of the present invention has an object-side surface facing toward the object side 2 as well as an image-side surface facing toward the image side 3. For example, the first lens element 10 has a first object-side surface 11 and a first image-side surface 12; the second lens element 20 has a second object-side surface 21 and a second image-side surface 22; the third lens element 30 has a third object-side surface 31 and a third image-side surface 32; the fourth lens element 40 has a fourth object-side surface 41 and a fourth image-side surface 42; the fifth lens element 50 has a fifth object-side surface 51 and a fifth image-side surface 52; and the sixth lens element 60 has a sixth object-side surface 61 and a sixth image-side surface 62. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) close to the optical axis 4.

Each lens element in the optical imaging lens set 1 of the present invention further has a central thickness on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, and the sixth lens element 60 has a sixth lens element thickness T6. Therefore, the total thickness of all the lens elements in the optical imaging lens set 1 along the optical axis 4 is ALT, ALT=T1+T2+T3+T4+T5+T6.

In addition, between two adjacent lens elements in the optical imaging lens set 1 of the present invention there is an air gap along the optical axis 4. For example, an air gap G12 is disposed between the first lens element 10 and the second lens element 20, an air gap G23 is disposed between the second lens element 20 and the third lens element 30, an air gap G34 is disposed between the third lens element 30 and the fourth lens element 40, an air gap G45 is disposed between the fourth lens element 40 and the fifth lens element 50, and an air gap G56 is disposed between the fifth lens element 50 and the sixth lens element 60. Therefore, the sum of total five air gaps between adjacent lens elements from the first lens element 10 to the sixth lens element 60 along the optical axis 4 is AAG, AAG=G12+G23+G34+G45+G56.

In addition, the distance between the first object-side surface 11 of the first lens element 10 to the image plane 71, namely the total length of the optical imaging lens set along the optical axis 4 is TTL; the effective focal length of the optical imaging lens set is EFL; the distance between the sixth image-side surface 62 of the six lens element 60 to the image plane 71 along the optical axis 4 is BFL; the distance between the sixth image-side surface 62 of the six lens element 60 to the filter 72 along the optical axis 4 is G6F; the thickness of the filter 72 along the optical axis 4 is TF; the distance between the filter 72 to the image plane 71 along the optical axis 4 is GFP; Therefore, BFL=G6F+TF+GFP.

First Example

Figures 2A, 2B, 2C, 2D:
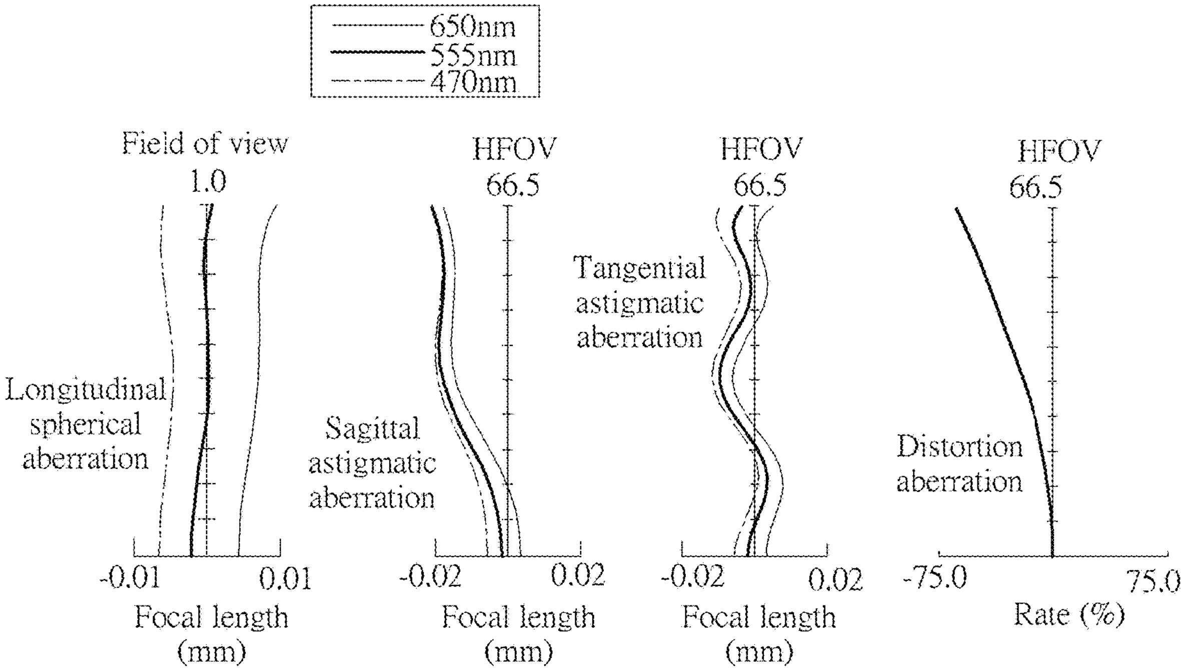
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stand for "Half Field of View (HFOV)", HFOV stands for the half field of view which is half of the field of view of the entire optical lens element system. The HFOV is 66.5 degrees.

The optical imaging lens set 1 of the first example has six lens elements 10 to 60 are made of a plastic material and have refractive power. The optical imaging lens set 1 also has an aperture stop 80, a filter 72, and an image plane 71. The aperture stop 80 is provided between the third lens element 30 and the fourth lens element 40. The filter 72 may be used for preventing specific wavelength light (such as the infrared light) reaching the image plane to adversely affect the imaging quality.

The first lens element 10 has negative refractive power. The first object-side surface 11 facing toward the object side 2 is a convex surface, having a convex part 13 in the vicinity of the optical axis and a convex part 14 in a vicinity of its circular periphery. The first image-side surface 12 facing toward the image side 3 is a concave surface, having a concave part 16 in the vicinity of the optical axis and a concave part 17 in a vicinity of its circular periphery. Besides, the first object-side surface 11 of the first lens element 10 is a spherical surface, and the first image-side 12 of the first lens element 10 is an aspherical surface.

The second lens element 20 has negative refractive power. The second object-side surface 21 facing toward the object side 2 has a convex part 23 in the vicinity of the optical axis and a convex part 24 in a vicinity of its circular periphery. The second image-side surface 22 facing toward the image side 3 is a concave surface, having a concave part 26 in the vicinity of the optical axis and a concave part 27 in a vicinity of its circular periphery. Both the second object-side surface 21 and the second image-side 22 of the second lens element 20 are aspherical surfaces.

The third lens element 30 has positive refractive power. The third object-side surface 31 facing toward the object side 2 has a convex part 33 in the vicinity of the optical axis and a convex part 34 in a vicinity of its circular periphery. The third image-side surface 32 facing toward the image side 3 is a convex surface, having a convex part 36 in the vicinity of the optical axis and a convex part 37 in a vicinity of its circular periphery. Both the third object-side surface 31 and the third image-side 32 of the third lens element 30 are aspherical surfaces.

The fourth lens element 40 has positive refractive power. The fourth object-side surface 41 facing toward the object side 2 is a convex surface, having a convex part 43 in the vicinity of the optical axis and a convex part 44 in a vicinity of its circular periphery. The fourth image-side surface 42 facing toward the image side 3 is a convex surface, having a convex part 46 in the vicinity of the optical axis and a convex part 47 in a vicinity of its circular periphery. Both the fourth object-side surface 41 and the fourth image-side 42 of the fourth lens element 40 are aspherical surfaces.

The fifth lens element 50 has negative refractive power. The fifth object-side surface 51 facing toward the object side 2 has a concave part 53 in the vicinity of the optical axis and a concave part 54 in a vicinity of its circular periphery. The fifth image-side surface 52 facing toward the image side 3 has a concave part 56 in the vicinity of the optical axis and a concave part 57 in a vicinity of its circular periphery. Both the fifth object-side surface 51 and the fifth image-side 52 of the fifth lens element 50 are aspherical surfaces.

The sixth lens element 60 has negative refractive power. The sixth object-side surface 61 facing toward the object side 2 has a convex part 63 in the vicinity of the optical axis and a convex part 64 in a vicinity of its circular periphery. The sixth image-side surface 62 facing toward the image side 3 has a concave part 66 in the vicinity of the optical axis and a convex part 67 in a vicinity of its circular periphery. Both the sixth object-side surface 61 and the sixth image-side 62 of the sixth lens element 60 are aspherical surfaces. The filter 72 may be disposed between the sixth lens element 60 and the image plane 71.

In the optical imaging lens element 1 of the present invention, except for the first object-side surface 11, others object-side surfaces 21/31/41/51/61 and image-side surfaces 12/22/32/42/52/62 are all aspherical. These aspheric coefficients are defined according to the following formula:

$$Z(Y) = \frac{Y^2}{R} \Bigg/ \left(1 + \sqrt{1 - (1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; and a2i is the aspheric coefficient of the 2i order.

The optical data of the first example of the optical imaging lens set 1 are shown in FIG. 18 while the aspheric surface data are shown in FIG. 19. In the present examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm). The length of the optical imaging lens set (the distance from the first object-side surface 11 of the first lens element 10 to the image plane 71) is 4.060 mm. HFOV is 66.5 degrees. Some important ratios of the first example are as follows:

| | |
|---|---|
| $(G12+G34)/T6$ | = 0.615 |
| $T2/T3$ | = 1.462 |
| $EFL/G23$ | = 3.848 |
| $EFL/AAG$ | = 1.466 |
| $AAG/BFL$ | = 2.078 |
| $EFL/T2$ | = 4.326 |
| $BFL/(G34+G45)$ | = 1.651 |
| $BFL/T1$ | = 1.718 |
| $BFL/T2$ | = 1.420 |
| $AAG/T3$ | = 4.314 |
| $EFL/T1$ | = 5.235 |
| $AAG/T4$ | = 1.867 |
| $T4/T2$ | = 1.580 |
| $T6/T2$ | = 1.332 |

Second Example

Figure 3:
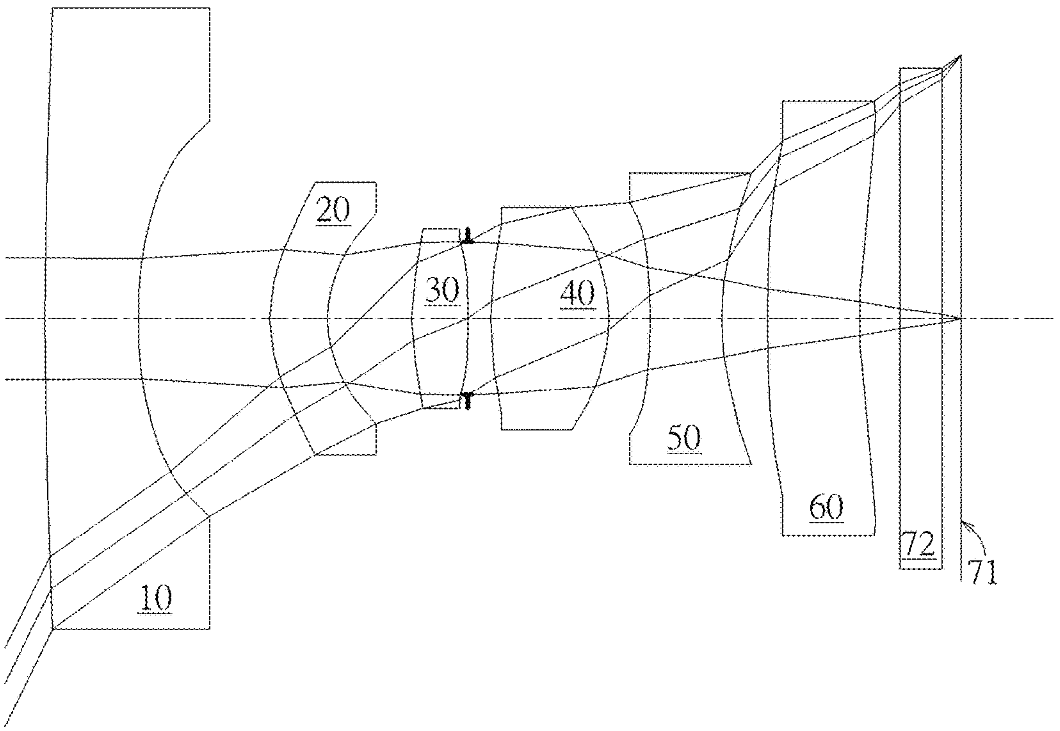
FIG. 3 illustrates a second example of the optical imaging lens set of six lens elements of the present invention.
Figures 4A, 4B, 4C, 4D:
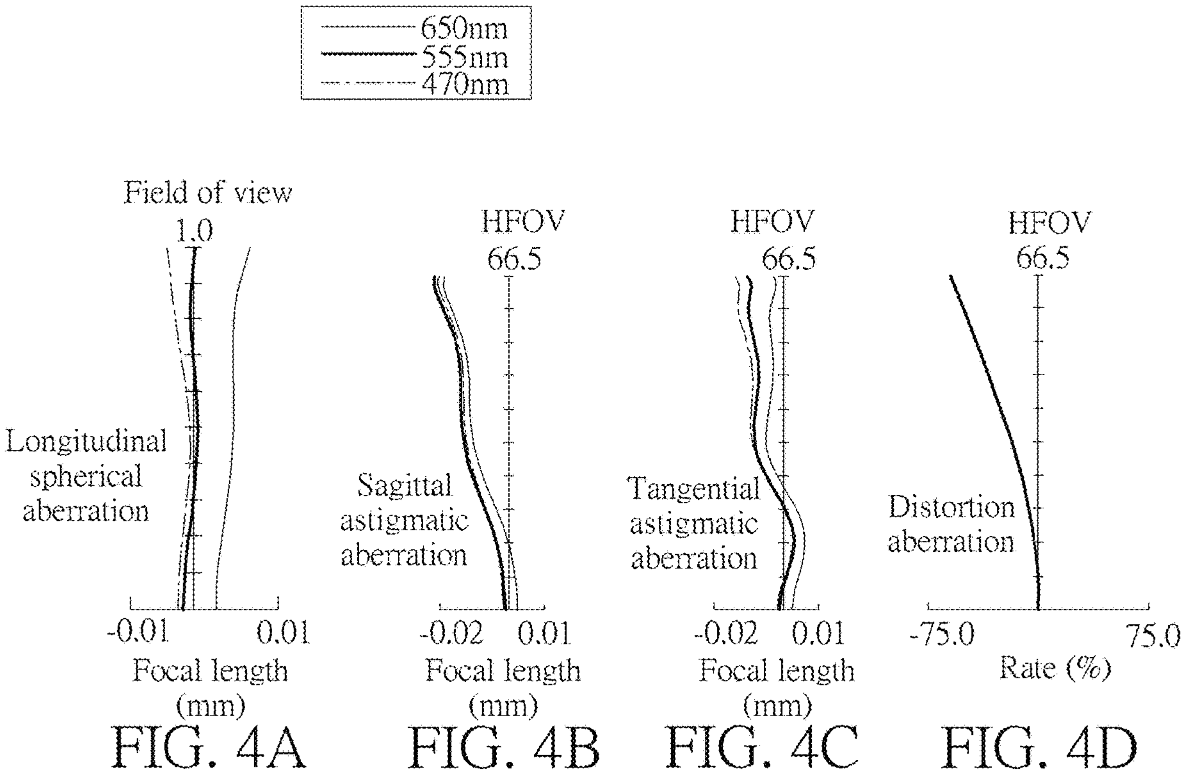
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.

Please refer to FIG. 3 which illustrates the second example of the optical imaging lens set 1 of the present invention. It is noted that from the second example to the following examples, in order to simplify the figures, only the components different from what the first example has and the basic lens elements will be labeled in figures. Others components that are the same as what the first example has, such as the object-side surface, the image-side surface, the part in a vicinity of the optical axis and the part in a vicinity of its circular periphery will be omitted in the following example. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The components in the second example are similar to those in the first example, but the optical data such as the curvature radius, the refractive power, the lens thickness, the lens focal length, the aspheric surface or the back focal length in this example are different from the optical data in the first example. The optical data of the second example of the optical imaging lens set are shown in FIG. 20 while the aspheric surface data are shown in FIG. 21. The length of the optical imaging lens set is 4.584 mm. HFOV is 66.5 degrees. Some important ratios of the second example are as follows:

| | |
|---|---|
| $(G12+G34)/T6$ | = 1.666 |
| $T2/T3$ | = 1.043 |

-continued

| | |
|---|---|
| $EFL/G23$ | = 3.749 |
| $EFL/AAG$ | = 0.981 |
| $AAG/BFL$ | = 3.198 |
| $EFL/T2$ | = 5.526 |
| $BFL/(G34+G45)$ | = 1.591 |
| $BFL/T1$ | = 1.085 |
| $BFL/T2$ | = 1.761 |
| $AAG/T3$ | = 5.877 |
| $EFL/T1$ | = 3.405 |
| $AAG/T4$ | = 2.773 |
| $T4/T2$ | = 2.031 |
| $T6/T2$ | = 1.595 |

Third Example

Figure 5:
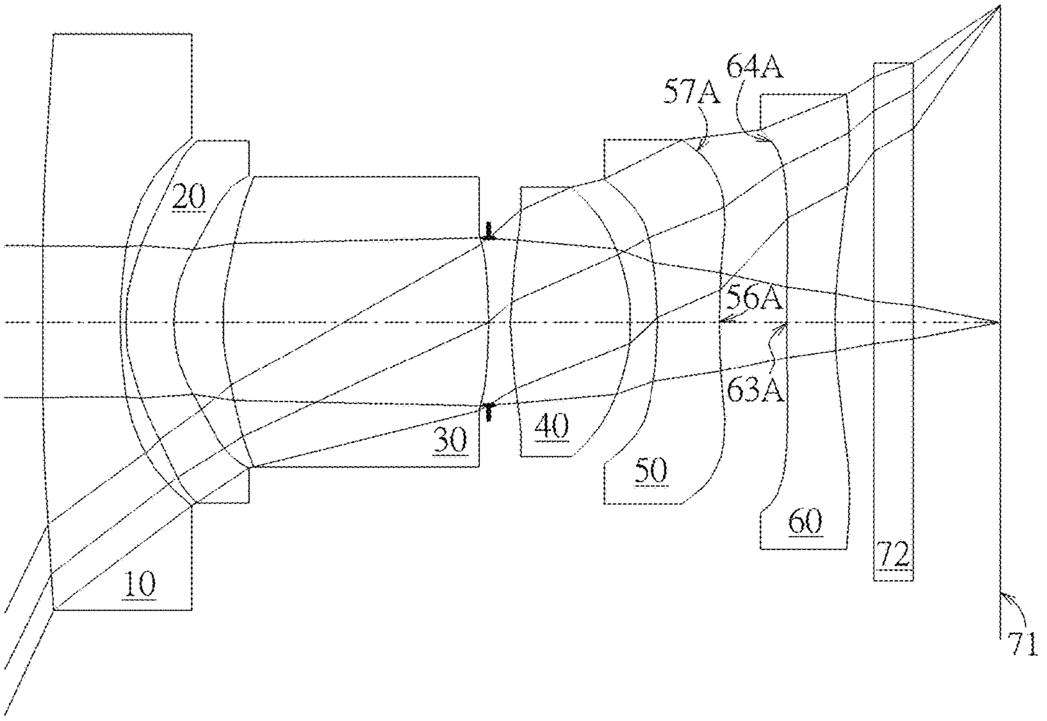
FIG. 5 illustrates a third example of the optical imaging lens set of six lens elements of the present invention.
Figures 6A, 6B, 6C, 6D:
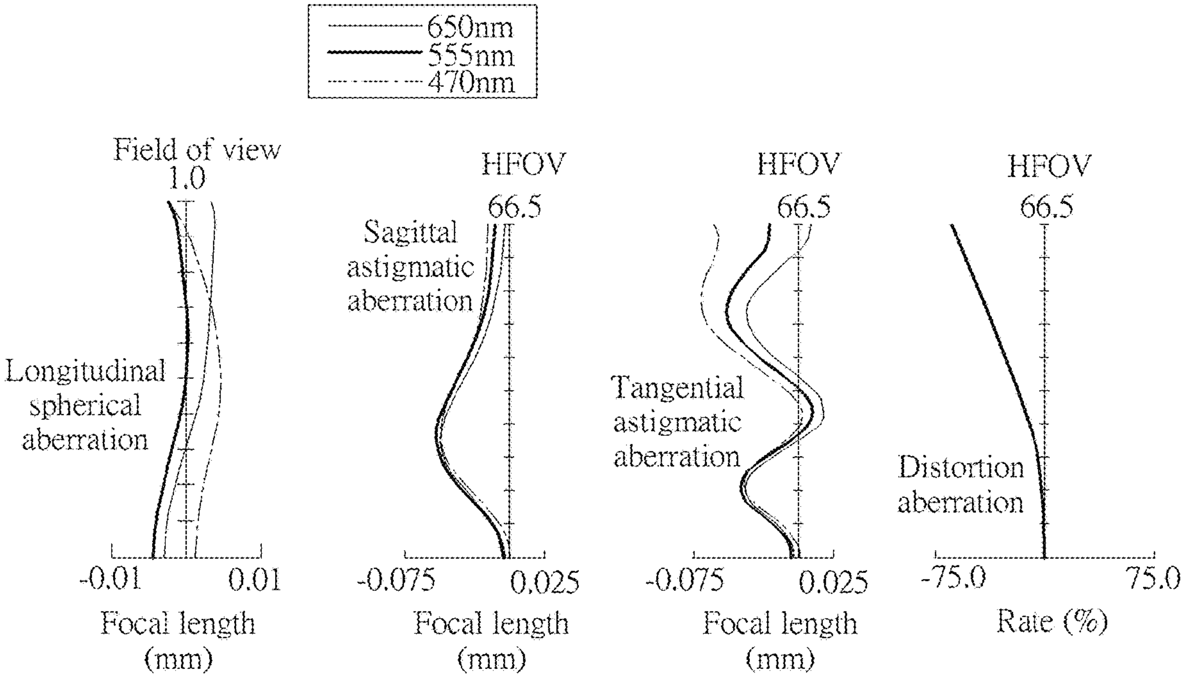
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.

Please refer to FIG. 5 which illustrates the third example of the optical imaging lens set 1 of the present invention. Please refer to FIG. 6A for the longitudinal spherical aberration on the image plane 71 of the third example; please refer to FIG. 6B for the astigmatic aberration on the sagittal direction; please refer to FIG. 6C for the astigmatic aberration on the tangential direction, and please refer to FIG. 6D for the distortion aberration. The components in the third example are similar to those in the first example, but the optical data such as the curvature radius, the refractive power, the lens thickness, the lens focal length, the aspheric surface or the back focal length in this example are different from the optical data in the first example, and in this example, the fifth image-side surface 52 of the fifth lens element 50 has a concave part 56A in the vicinity of the optical axis and a convex part 57A in a vicinity of its circular periphery; the sixth object-side surface 61 of the fifth lens element 60 has a convex part 63A in the vicinity of the optical axis and a concave part 64A in a vicinity of its circular periphery. The optical data of the third example of the optical imaging lens set are shown in FIG. 22 while the aspheric surface data are shown in FIG. 23. The length of the optical imaging lens set is 5.031 mm. HFOV is 66.5 degrees. Some important ratios of the third example are as follows:

| | |
|---|---|
| $(G12+G34)/T6$ | = 0.564 |
| $T2/T3$ | = 0.179 |
| $EFL/G23$ | = 8.019 |
| $EFL/AAG$ | = 2.322 |
| $AAG/BFL$ | = 1.045 |
| $EFL/T2$ | = 8.404 |
| $BFL/(G34+G45)$ | = 3.383 |
| $BFL/T1$ | = 2.097 |
| $BFL/T2$ | = 3.464 |
| $AAG/T3$ | = 0.650 |
| $EFL/T1$ | = 5.087 |

-continued

| | |
|---|---|
| $AAG/T4$ | = 1.434 |
| $T4/T2$ | = 2.524 |
| $T6/T2$ | = 1.000 |

Fourth Example

Figure 7:
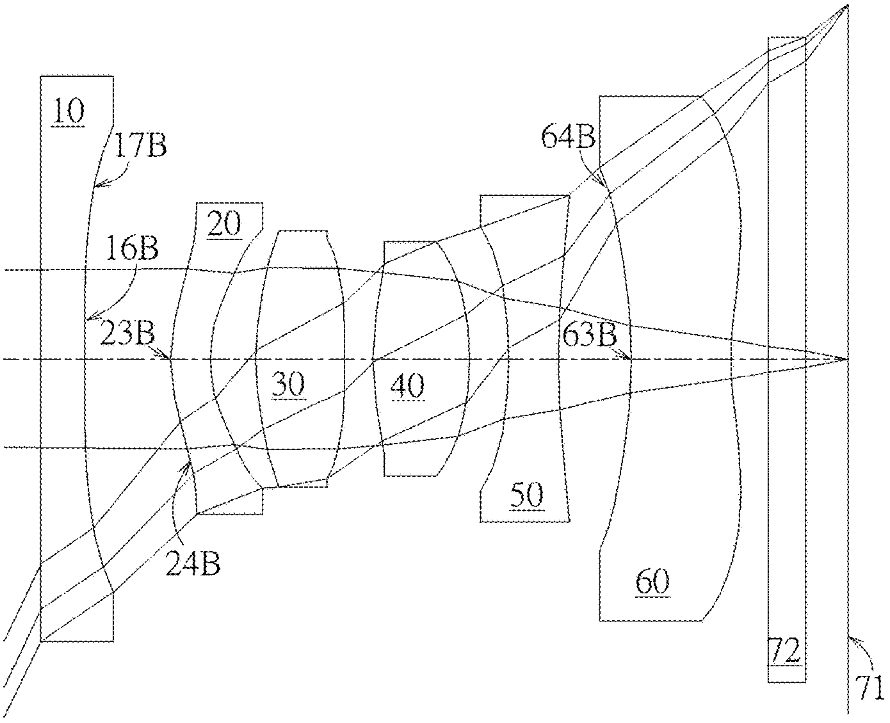
FIG. 7 illustrates a fourth example of the optical imaging lens set of six lens elements of the present invention.
Figures 8A, 8B, 8C, 8D:
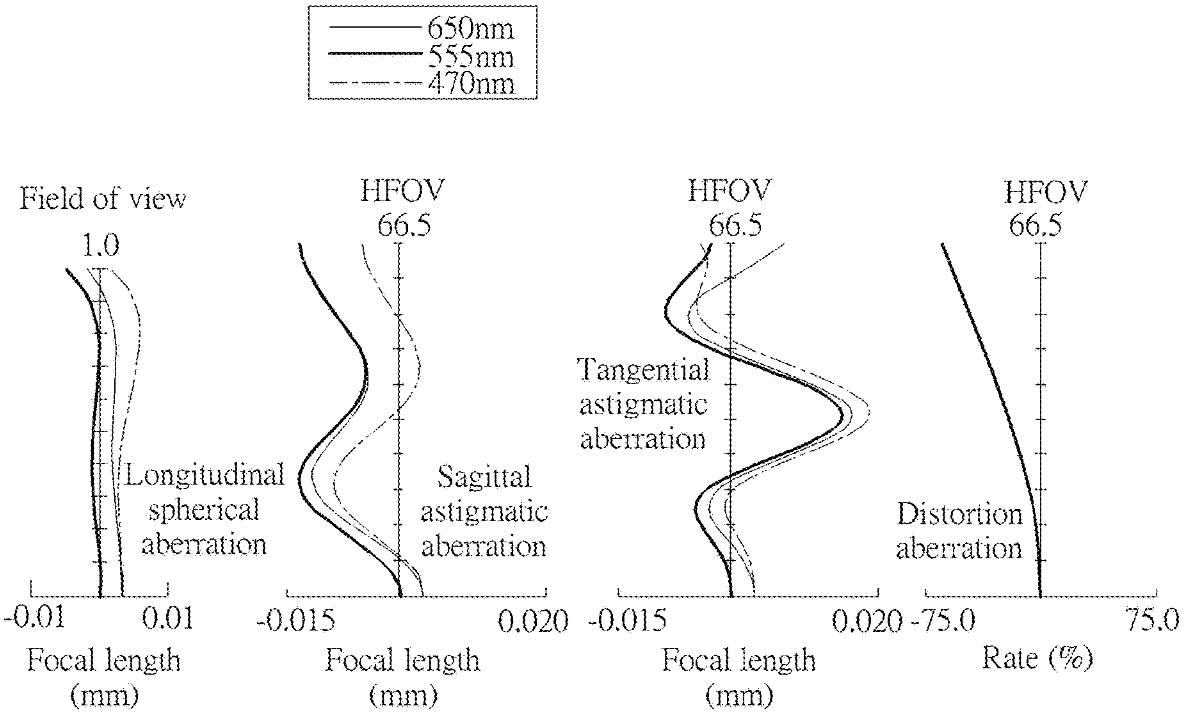
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.

Please refer to FIG. 7 which illustrates the fourth example of the optical imaging lens set 1 of the present invention. Please refer to FIG. 8A for the longitudinal spherical aberration on the image plane 71 of the fourth example; please refer to FIG. 8B for the astigmatic aberration on the sagittal direction; please refer to FIG. 8C for the astigmatic aberration on the tangential direction, and please refer to FIG. 8D for the distortion aberration. The components in the fourth example are similar to those in the first example, but the optical data such as the curvature radius, the refractive power, the lens thickness, the lens focal length, the aspheric surface or the back focal length in this example are different from the optical data in the first example, and in this example, the first lens element has positive refractive power; first image-side surface 12 of the first lens element 10 has a convex part 16B in the vicinity of the optical axis and a concave part 17B in a vicinity of its circular periphery; the second object-side surface 21 of the second lens element 20 has a convex part 23B in the vicinity of the optical axis and a concave part 24B in a vicinity of its circular periphery; the sixth object-side surface 61 of the sixth lens element 60 has a concave part 63B in the vicinity of the optical axis and a concave part 64B in a vicinity of its circular periphery. The optical data of the fourth example of the optical imaging lens set are shown in FIG. 24 while the aspheric surface data are shown in FIG. 25. The length of the optical imaging lens set is 4.685 mm. HFOV is 66.5 degrees. Some important ratios of the fourth example are as follows:

| | |
|---|---|
| $(G12+G34)/T6$ | = 1.134 |
| $T2/T3$ | = 0.328 |
| $EFL/G23$ | = 10.418 |
| $EFL/AAG$ | = 1.734 |
| $AAG/BFL$ | = 2.316 |
| $EFL/T2$ | = 11.833 |
| $BFL/(G34+G45)$ | = 1.755 |
| $BFL/T1$ | = 2.604 |
| $BFL/T2$ | = 2.946 |
| $AAG/T3$ | = 2.241 |
| $EFL/T1$ | = 10.460 |
| $AAG/T4$ | = 2.787 |
| $T4/T2$ | = 2.448 |
| $T6/T2$ | = 2.534 |

Fifth Example

Figure 9:
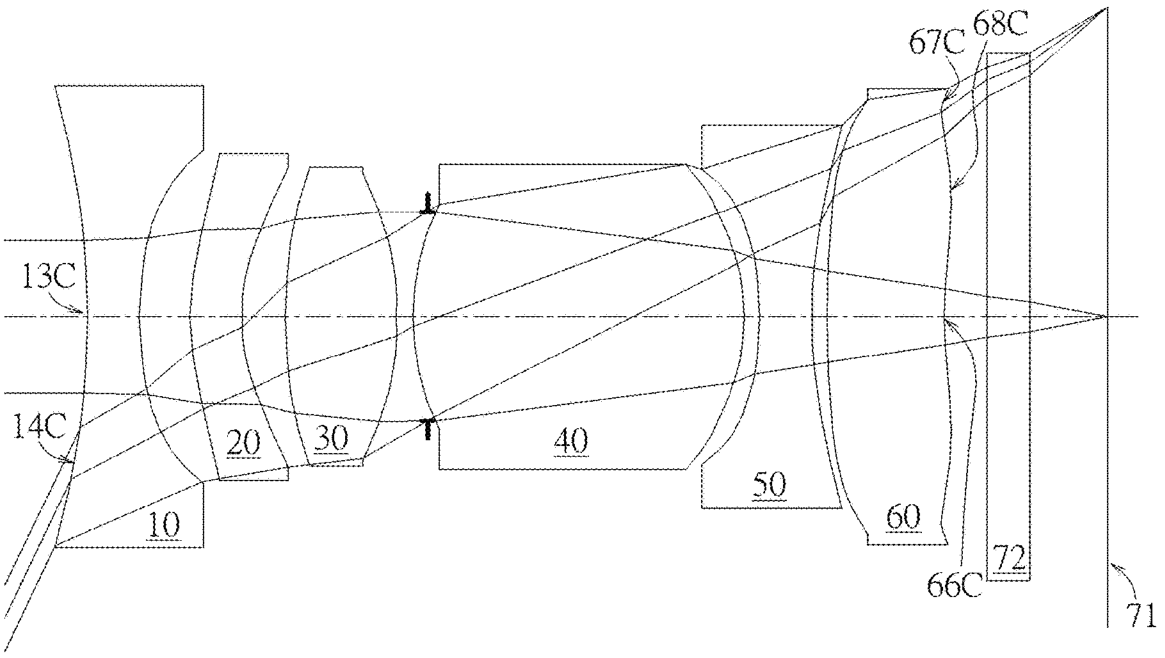
FIG. 9 illustrates a fifth example of the optical imaging lens set of six lens elements of the present invention.

Please refer to FIG. 9 which illustrates the fifth example of the optical imaging lens set 1 of the present invention.

Figures 10A, 10B, 10C, 10D:
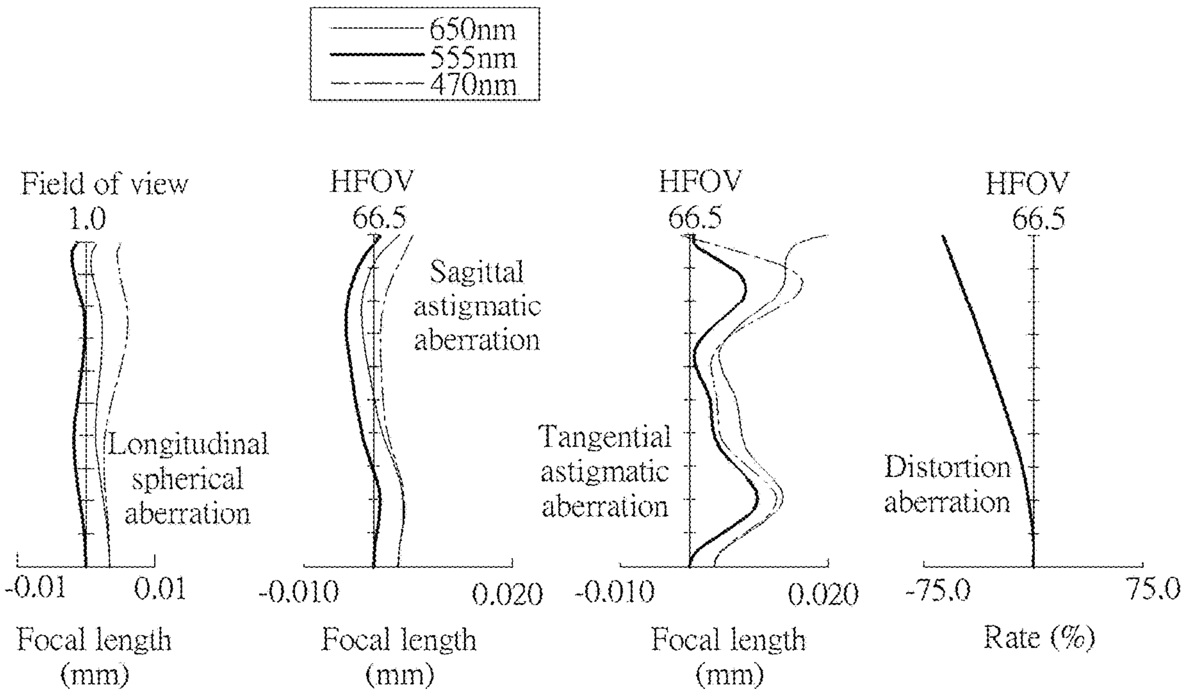
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.

Please refer to FIG. 10A for the longitudinal spherical aberration on the image plane 71 of the fifth example; please refer to FIG. 10B for the astigmatic aberration on the sagittal direction; please refer to FIG. 10C for the astigmatic aberration on the tangential direction, and please refer to FIG. 10D for the distortion aberration. The components in the fifth example are similar to those in the first example, but the optical data such as the curvature radius, the refractive power, the lens thickness, the lens focal length, the aspheric surface or the back focal length in this example are different from the optical data in the first example and in this example, the first object-side surface 11 of the first lens element 10 has a concave part 13C in the vicinity of the optical axis and a concave part 14C in a vicinity of its circular periphery; the sixth image-side surface 62 of the sixth lens element 60 has a concave part 66C in the vicinity of the optical axis, a concave part 67C in a vicinity of its circular periphery, and a convex part 68C disposed between the concave part 66C and the concave part 67C. The optical data of the fifth example of the optical imaging lens set are shown in FIG. 26 while the aspheric surface data are shown in FIG. 27. The length of the optical imaging lens set is 5.045 mm. HFOV is 66.5 degrees. Some important ratios of the fifth example are as follows:

| | |
|---|---|
| $(G12+G34)/T6$ | = 0.582 |
| $T2/T3$ | = 0.363 |
| $EFL/G23$ | = 9.138 |
| $EFL/AAG$ | = 2.797 |
| $AAG/BFL$ | = 0.882 |
| $EFL/T2$ | = 7.738 |
| $BFL/(G34+G45)$ | = 5.118 |
| $BFL/T1$ | = 3.150 |
| $BFL/T2$ | = 3.137 |
| $AAG/T3$ | = 1.004 |
| $EFL/T1$ | = 7.769 |
| $AAG/T4$ | = 0.430 |
| $T4/T2$ | = 6.431 |
| $T6/T2$ | = 2.258 |

Sixth Example

Figure 11:
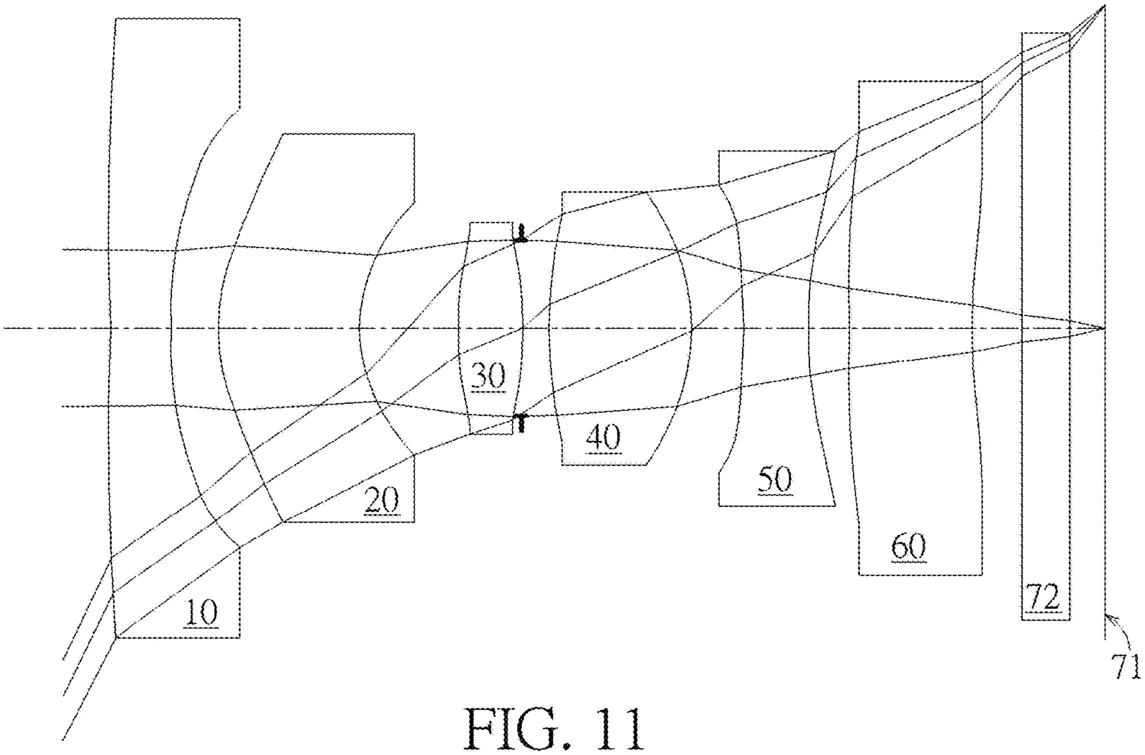
FIG. 11 illustrates a sixth example of the optical imaging lens set of six lens elements of the present invention.
Figures 12A, 12B, 12C, 12D:
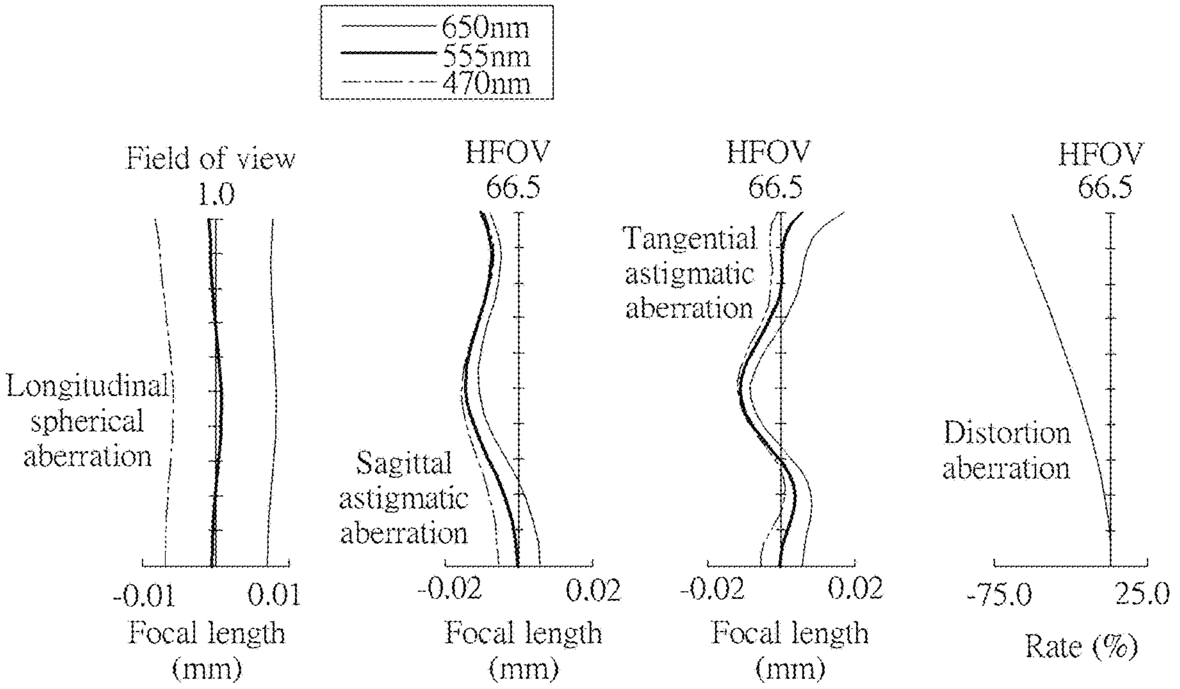
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

Please refer to FIG. 11 which illustrates the sixth example of the optical imaging lens set 1 of the present invention. Please refer to FIG. 12A for the longitudinal spherical aberration on the image plane 71 of the sixth example; please refer to FIG. 12B for the astigmatic aberration on the sagittal direction; please refer to FIG. 12C for the astigmatic aberration on the tangential direction, and please refer to FIG. 12D for the distortion aberration. The components in the sixth example are similar to those in the first example, but the optical data such as the curvature radius, the refractive power, the lens thickness, the lens focal length, the aspheric surface or the back focal length in this example are different from the optical data in the first example. The optical data of the sixth example of the optical imaging lens set are shown in FIG. 28 while the aspheric surface data are shown in FIG. 29. The length of the optical imaging lens set is 4.154 mm. HFOV is 66.5 degrees. Some important ratios of the sixth example are as follows:

| | |
|---|---|
| (G12 + G34)/T6 | = 0.612 |
| T2/T3 | = 2.248 |
| EFL/G23 | = 4.164 |
| EFL/AAG | = 1.543 |
| AAG/BFL | = 2.020 |
| EFL/T2 | = 2.927 |
| BFL/(G34 + G45) | = 1.671 |
| BFL/T1 | = 2.212 |
| BFL/T2 | = 0.939 |
| AAG/T3 | = 4.263 |
| EFL/T1 | = 6.896 |
| AAG/T4 | = 1.871 |
| T4/T2 | = 1.014 |
| T6/T2 | = 0.876 |

Seventh Example

Figure 13:
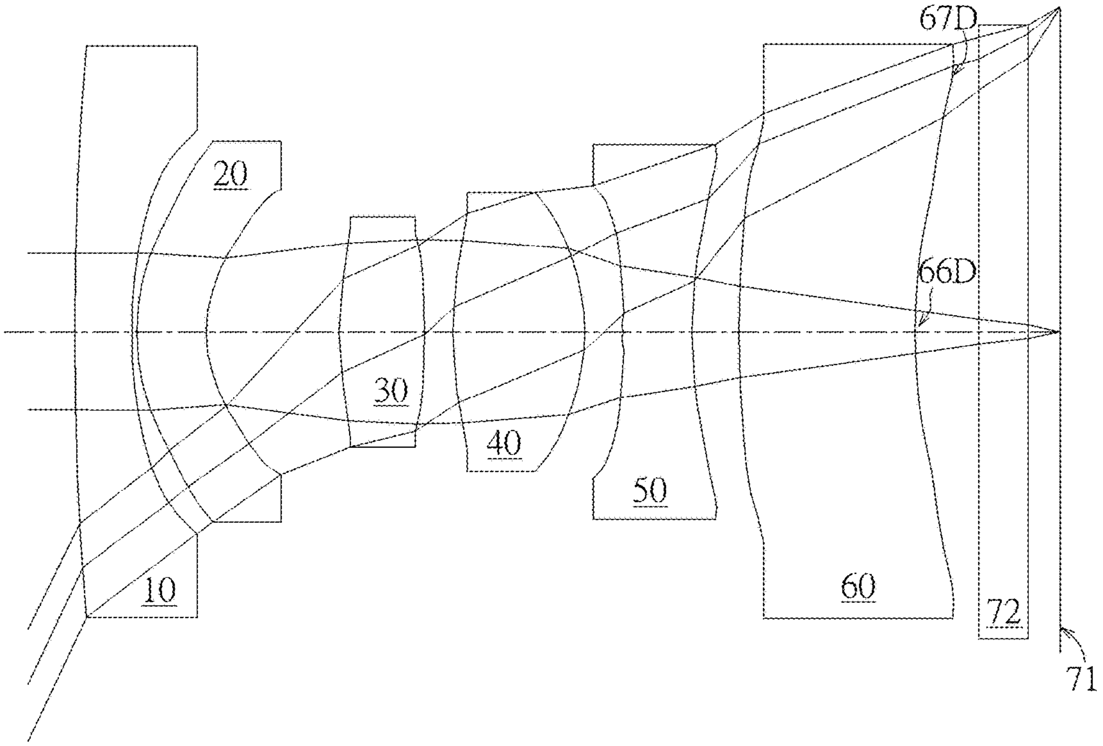
FIG. 13 illustrates a seventh example of the optical imaging lens set of six lens elements of the present invention.
Figures 14A, 14B, 14C, 14D:
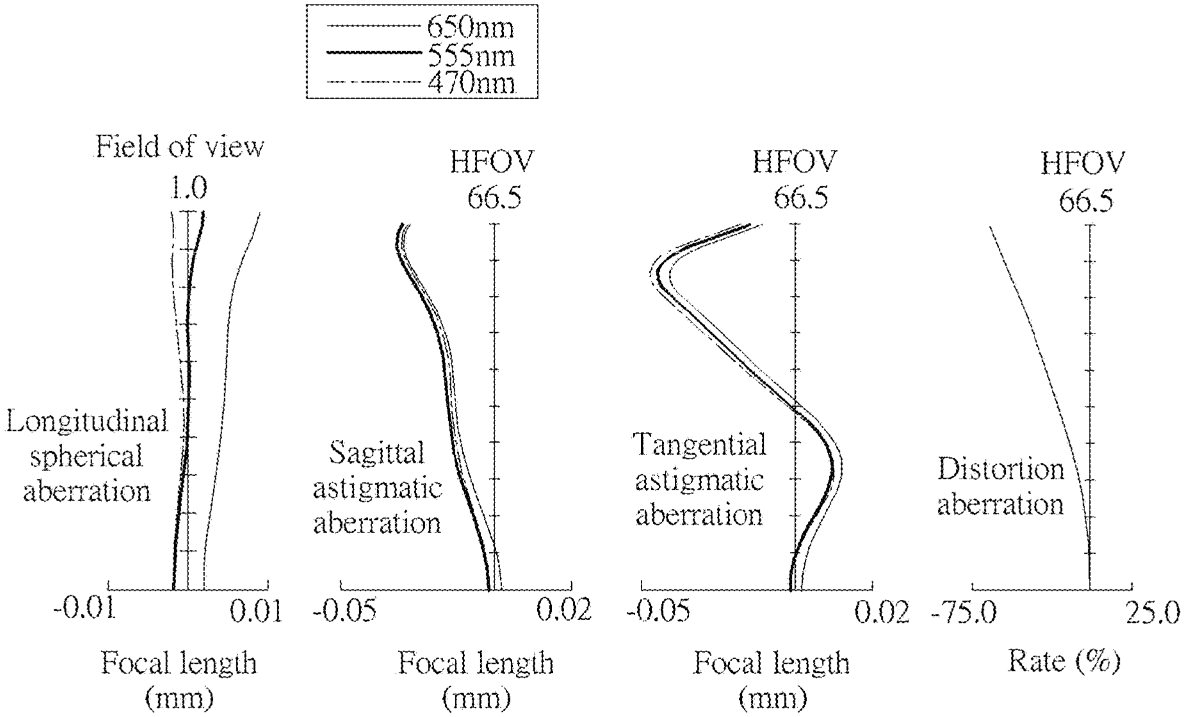
FIG. 14A illustrates the longitudinal spherical aberration on the image plane of the seventh example.
FIG. 14B illustrates the astigmatic aberration on the sagittal direction of the seventh example.
FIG. 14C illustrates the astigmatic aberration on the tangential direction of the seventh example.
FIG. 14D illustrates the distortion aberration of the seventh example.

Please refer to FIG. 13 which illustrates the seventh example of the optical imaging lens set 1 of the present invention. Please refer to FIG. 14A for the longitudinal spherical aberration on the image plane 71 of the seventh example; please refer to FIG. 14B for the astigmatic aberration on the sagittal direction; please refer to FIG. 14C for the astigmatic aberration on the tangential direction, and please refer to FIG. 14D for the distortion aberration. The components in the seventh example are similar to those in the first example, but the optical data such as the curvature radius, the refractive power, the lens thickness, the lens focal length, the aspheric surface or the back focal length in this example are different from the optical data in the first example, and in this example, the sixth image-side surface 62 of the sixth lens element 60 has a concave part 66D in the vicinity of the optical axis and a concave part 67D in a vicinity of its circular periphery. The optical data of the seventh example of the optical imaging lens set are shown in FIG. 30 while the aspheric surface data are shown in FIG. 31. The length of the optical imaging lens set is 4.163 mm. HFOV is 66.5 degrees. Some important ratios of the seventh example are as follows:

| | |
|---|---|
| (G12 + G34)/T6 | = 0.194 |
| T2/T3 | = 0.798 |
| EFL/G23 | = 3.114 |
| EFL/AAG | = 1.638 |
| AAG/BFL | = 1.974 |
| EFL/T2 | = 5.907 |
| BFL/(G34 + G45) | = 1.890 |
| BFL/T1 | = 2.192 |

-continued

| | |
|---|---|
| BFL/T2 | = 1.827 |
| AAG/T3 | = 2.878 |
| EFL/T1 | = 7.088 |
| AAG/T4 | = 1.929 |
| T4/T2 | = 1.870 |
| T6/T2 | = 2.497 |

Some important ratios in each example are shown in FIG. 32.

In the light of the above examples, the inventors observe the following features:

1. The third lens element has positive refractive power, to provide the needed refractive power for the optical imaging lens set.

2. The first image-side surface of the first lens element has a concave part in a vicinity of its circular periphery; the second image-side surface of the second lens element has a concave part in a vicinity of the optical axis, the fourth object-side surface of the fourth lens element has a convex part in a vicinity of its circular periphery, the fifth object-side surface of the fifth lens element has a concave part in a vicinity of the optical axis, the sixth image-side surface of the sixth lens element has a concave part in a vicinity of the optical axis, where each of the surfaces match each other, in order to improve the aberration.

3. The sixth lens element is made of plastic, helping to decrease the manufacturing cost and lightened the weight, besides, helping to form the aspherical surface.

4. If further matching the second object-side surface of the second lens element has a convex part in a vicinity of the optical axis, the second image-side surface of the second lens element has a concave part in a vicinity of its circular periphery; the third object-side surface of the third lens element has a convex part in a vicinity of the optical axis and a convex part in a vicinity of its circular periphery; the third image-side surface of the third lens element has a convex part in a vicinity of the optical axis and a convex part in a vicinity of its circular periphery; the fourth object-side surface of the fourth lens element has a convex part in a vicinity of the optical axis; the fourth image-side surface of the fourth lens element has a convex part in a vicinity of the optical axis and a convex part in a vicinity of its circular periphery; the fifth object-side surface of the fifth lens element has a concave part in a vicinity of its circular periphery; and the fifth image-side surface of the fifth lens element has a concave part in a vicinity of the optical axis, where each of the surfaces match each other, remaining good performance while decreasing the total length of the optical imaging lens set. Furthermore, if all of the lens elements are made of plastic, this can further help to decrease the manufacturing cost and lighten the weight, helping to form the aspherical surface.

In addition, the inventors discover that there are some better ratio ranges for different data according to the above various important ratios. Better ratio ranges help the designers to design the better optical performance and an effectively reduced length of a practically possible optical imaging lens set. For example:

(1) Since the lens element become lighter and thinner, and the quality demands get higher and higher, so that the lens is designed to have different shape surface in a vicinity of the optical axis and in vicinity of its circular periphery, the thickness is different in the central part of the lens element or near the edge of the lens element. Considering the characteristic of light, the light which is emitted from the near-edge side of the lens element has the longer path and larger refraction angle to focus onto the image plane. Moreover, the air gaps also influence the quality of the optical imaging lens set. The present invention has larger HFOV, because decreasing EFL can further enlarge the HFOV, so that the present invention has smaller EFL. In addition, the first lens element and the second lens element have larger optical effective apertures. Therefore, if the shorter ratio of T1 and T2 are smaller than EFL, large T1 and T2 can be avoid, and further decreasing the total length of the optical imaging lens set. The present invention satisfies the relationships: 4.7≤EFL/T1 and 2.8≤EFL/T2. Besides, considering the relationship between the air gaps and EFL, the present invention satisfies the relationships: 3≤EFL/G23≤11 and 0.9≤EFL/AAG≤2.6. When those relationships are satisfied, the optical imaging lens set has shorter total length, but still having good performance and simple manufacturing process. Furthermore, when the relationship 3.5≤EFL/G23≤11 is further satisfied, since having a shorter G23, so each component of the optical imaging lens set has a better arrangement, and increasing the yield.

(2) BFL is the distance between the image-side surface of the sixth lens element to an image plane along the optical axis. The present invention needs a space to accumulate components such as the filter, so BFL cannot be shrunk unlimited. Besides, BFL influences the value of EFL, and EFL is also influenced by the thickness of lens element. Therefore, the present invention satisfies the relationships: AAG/BFL≤2.1, 1.88≤BFL/(G34+G45)≤6, 1.5≤BFL/T1 and 1.4≤BFL/T2, when those relationships are satisfied, the optical imaging lens set has larger HFOV, but still has good performance. In addition, if further satisfying the relationship: 1.9≤BFL/T2, since the present invention has larger BEL, it has a simpler manufacturing process.

(3) Since G12, G34 and G56 are not limited by the surface shape of adjacent surfaces, so G12, G34 and G56 can be shrunk more, so AAG can also be shrunk too. AAG is a relatively large value, so if AAG is shrunk, the total length can be decreased effectively. The present invention satisfy the relationships: (G12+G34)/T6≤1.7, AAG/T3≤3.3 and AAG/T4≤2.8.

(4) As mentioned above, T2 can be shrunk more, so if the relationships of T2/T3≤1.5, 1≤T4/T2 and 1.1≤T6/T2 are satisfied, the optical imaging lens set has better arrangement.

(5) Preferably, the present invention further satisfies the following relationships:

$$0.01 \leqq (G12+G34)/T6 \leqq 1.7,\ 0.01 \leqq T2/T3 \leqq 1.5,\ 0.4 \leqq AAG/BFL \leqq 2.1,\ 2.8 \leqq EFL/T2 \leqq 12,$$

$$1.5 \leqq BFL/T1 \leqq 3.5,\ 1.4 \leqq BFL/T2 \leqq 4,\ 0.3 \leqq AAG/T3 \leqq 3.3,\ 4.7 \leqq EFL/T1 \leqq 12,$$

$$0.05 \leqq AAG/T4 \leqq 2.8,\ 1 \leqq T4/T2 \leqq 7 \text{ and } 1.1 \leqq T6/T2 \leqq 3.$$

Figure 16:
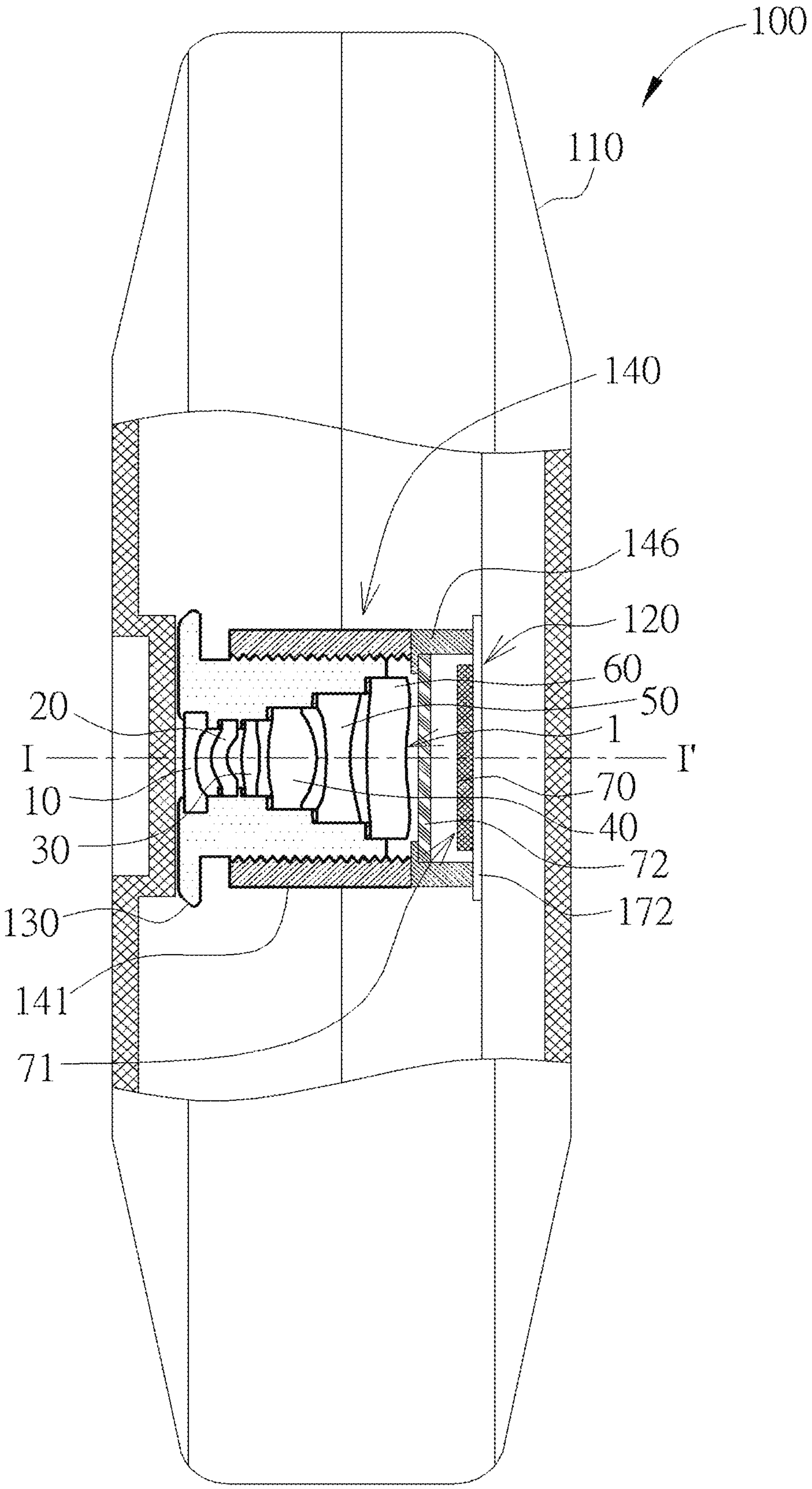
FIG. 16 illustrates a first preferred example of the portable electronic device with an optical imaging lens set of the present invention.

The optical imaging lens set 1 of the present invention may be applied to an electronic device, such as game consoles or driving recorders. Please refer to FIG. 16. FIG. 16 illustrates a first preferred example of the optical imaging lens set 1 of the present invention for use in a portable electronic device 100. The electronic device 100 includes a case 110, and an image module 120 mounted in the case 110. A driving recorder is illustrated in FIG. 16 as an example, but the electronic device 100 is not limited to a driving recorder.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 72 may be omitted in other examples although the optional filter 72 is present in this example. The case 110, the barrel 130, and/or the module housing unit 140 may be a single element or consist of a plurality of elements, but the present invention is not limited to this.

Each one of the six lens elements 10, 20, 30, 40, 50 and 60 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Figure 17:
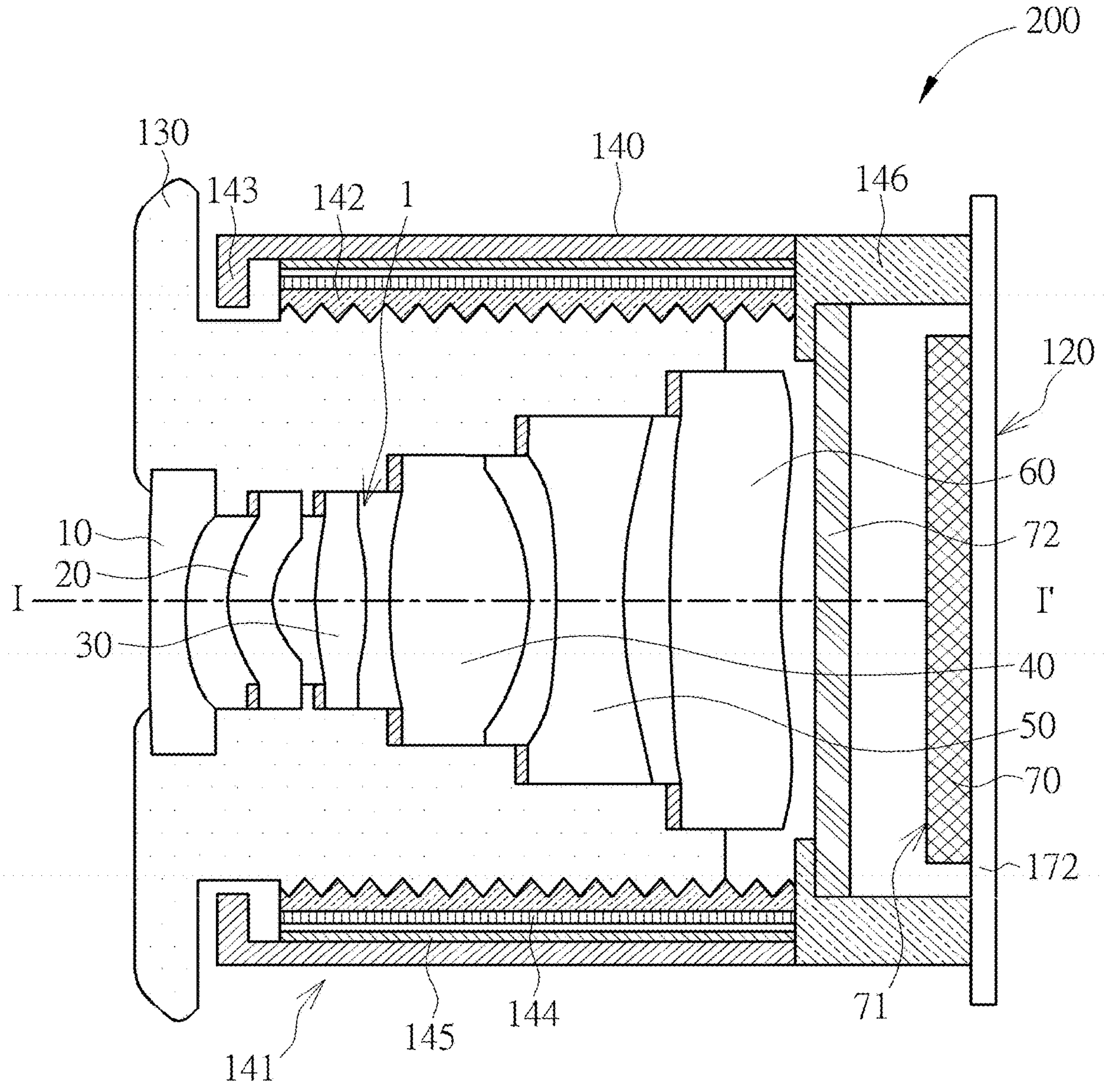
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 72, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis, comprising a first lens element, a second lens element, a third lens element, a fourth lens element, a fifth lens element, and a sixth lens element, each of the first, second, third, fourth, fifth, and sixth lens elements having an object-side surface facing toward the object side and an image-side surface facing toward the image side, the optical imaging lens does not include any lens element other than the first lens element, the second lens element, the third lens element, the fourth lens element, the fifth lens element, and the sixth lens element, wherein:

the object-side surface of the second lens element has a convex part in a vicinity of the optical axis; and the image-side surface of the fourth lens element has a convex part in a vicinity of a periphery of the fourth lens element;

wherein EFL is an effective focal length of the optical imaging lens, T1 is a thickness of the first lens element along the optical axis, an Abbe number of the sixth lens element is greater than an Abbe number of the fifth lens element, a thickness of the third lens element along the optical axis is greater than an air gap between the third lens element and the fourth lens element along the optical axis, the thickness of the third lens element along the optical axis is greater than an air gap between the fourth lens element and the fifth lens element along the optical axis, and the optical imaging lens satisfies the relation:

$$4.7 \leqq EFL/T1.$$

2. The optical imaging lens of claim 1, wherein G12 is an air gap between the first lens element and the second lens element along the optical axis, G34 is the air gap between the third lens element and the fourth lens element along the optical axis, T6 is a thickness of the sixth lens element along the optical axis, and the optical imaging lens satisfies the relation: (G12+G34)/T6≤1.7.

3. The optical imaging lens of claim 1, wherein AAG is a sum of all air gaps from the first lens element to the sixth lens element along the optical axis, BFL is a distance between the image-side surface of the sixth lens element and an image plane along the optical axis, and the optical imaging lens satisfies the relation: AAG/BFL≤2.1.

4. The optical imaging lens of claim 1, wherein T2 is a thickness of the second lens element along the optical axis and the optical imaging lens satisfies the relation: 2.8≤EFL/T2.

5. The optical imaging lens of claim 1, wherein BFL is a distance between the image-side surface of the sixth lens element and an image plane along the optical axis, T2 is a thickness of the second lens element along the optical axis, and the optical imaging lens satisfies the relation: 1.4≤BFL/T2.

6. The optical imaging lens of claim 1, wherein AAG is a sum of all five air gaps between each lens element from the first lens element to the sixth lens element along the optical axis, T4 is a thickness of the fourth lens element along the optical axis, and the optical imaging lens satisfies the relation: AAG/T4≤2.8.

7. The optical imaging lens of claim 1, wherein G23 is an air gap between the second lens element and the third lens element along the optical axis and the optical imaging lens satisfies the relation: 3.5≤EFL/G23≤11.

8. The optical imaging lens of claim 1, wherein an air gap between the second lens element and the third lens element along the optical axis is greater than the air gap between the fourth lens element and the fifth lens element along the optical axis.

9. The optical imaging lens of claim 1, wherein T1 is greater than the air gap between the third lens element and the fourth lens element along the optical axis.

10. The optical imaging lens of claim 1, wherein T1 is greater than the air gap between the fourth lens element and the fifth lens element along the optical axis.

11. An optical imaging lens, from an object side to an image side in order along an optical axis, comprising a first lens element, a second lens element, a third lens element, a fourth lens element, a fifth lens element, and a sixth lens element, each of the first, second, third, fourth, fifth, and sixth lens elements having an object-side surface facing toward the object side and an image-side surface facing toward the image side, the optical imaging lens does not include any lens element other than the first lens element, the second lens element, the third lens element, the fourth lens element, the fifth lens element, and the sixth lens element, wherein:

the image-side surface of the fourth lens element has a convex part in a vicinity of a periphery of the fourth lens element; and the object-side surface of the sixth lens element has a convex part in a vicinity of the optical axis;

wherein EFL is an effective focal length of the optical imaging lens, T1 is a thickness of the first lens element along the optical axis, an Abbe number of the sixth lens element is greater than an Abbe number of the fifth lens element, a thickness of the third lens element along the optical axis is greater than an air gap between the third lens element and the fourth lens element along the optical axis, the thickness of the third lens element along the optical axis is greater than an air gap between the fourth lens element and the fifth lens element along the optical axis, and the optical imaging lens satisfies the relation:

$$4.7 \leqq EFL/T1.$$

12. The optical imaging lens of claim 11, wherein the object-side surface of the third lens element has a convex part in a vicinity of the optical axis.

13. The optical imaging lens of claim 11, wherein the image-side surface of the fifth lens element has a concave part in a vicinity of the optical axis.

14. The optical imaging lens of claim 11, wherein T2 is a thickness of the second lens element along the optical axis, T3 is the thickness of the third lens element along the optical axis, and the optical imaging lens satisfies the relation: T2/T3≤1.5.

15. The optical imaging lens of claim 11, wherein BFL is a distance between the image-side surface of the sixth lens element to an image plane along the optical axis, G34 is the air gap between the third lens element and the fourth lens element along the optical axis, G45 is the air gap between the fourth lens element and the fifth lens element along the optical axis, and the optical imaging lens satisfies the relation: 1.88≤BFL/(G34+G45)≤6.

16. The optical imaging lens of claim 11, wherein BFL is a distance between the image-side surface of the sixth lens element and an image plane along the optical axis, and the optical imaging lens satisfies the relation: 1.5≤BFL/T1.

17. The optical imaging lens of claim 11, wherein BFL is a distance between the image-side surface of the sixth lens element and an image plane along the optical axis, T2 is a thickness of the second lens element along the optical axis, and the optical imaging lens satisfies the relation: 1.9≤BFL/T2.

18. The optical imaging lens of claim 11, wherein AAG is a sum of all air gaps from the first lens element to the sixth lens element along the optical axis, T3 is the thickness of the third lens element along the optical axis, and the optical imaging lens satisfies the relation: AAG/T3≤3.3.

19. The optical imaging lens of claim 11, wherein T6 is a thickness of the sixth lens element along the optical axis, T2 is a thickness of the second lens element along the optical axis, and the optical imaging lens satisfies the relation: 1.1≤T6/T2.

20. The optical imaging lens of claim 11, wherein the thickness of the third lens element along the optical axis is greater than an air gap between the fifth lens element and the sixth lens element along the optical axis.

* * * * *